US006642883B2

(12) United States Patent
Jacomb-Hood et al.

(10) Patent No.: US 6,642,883 B2
(45) Date of Patent: Nov. 4, 2003

(54) MULTI-BEAM ANTENNA WITH INTERFERENCE CANCELLATION NETWORK

(75) Inventors: Anthony Wykeham Jacomb-Hood, Yardley, PA (US); Vladimir Volman, Newtown, PA (US); Erik Lier, Newtown, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/942,444

(22) Filed: Aug. 30, 2001

(65) Prior Publication Data

US 2003/0052819 A1 Mar. 20, 2003

(51) Int. Cl.[7] .......................... H04B 7/185
(52) U.S. Cl. .................. 342/354; 342/379; 455/13.3
(58) Field of Search ..................... 342/354, 352, 342/379; 455/13.3

(56) References Cited

U.S. PATENT DOCUMENTS

| | | | | |
|---|---|---|---|---|
| 4,145,658 A | * | 3/1979 | Acampora et al. | 342/354 |
| 4,780,721 A | * | 10/1988 | Dobson | 342/178 |
| 5,926,135 A | * | 7/1999 | Minkoff | 342/17 |
| 5,963,165 A | * | 10/1999 | Das | 342/353 |
| 6,008,760 A | * | 12/1999 | Shattil | 250/551 |
| 6,169,513 B1 | * | 1/2001 | Cohen | 342/354 |

OTHER PUBLICATIONS

Hinshilwood, D. J. et al, "The Cancellation of Interference by Sidelobe Annihilation, " Antennas and Propagation Society International Symposium, Jun. 1991, pp. 110–113, vol. 1.*

Hafeez, Abdulrauf et al, "Capacity and Qualtiy Enhancement for ANSI–136 Downlink Using Interference Cancellation and Beamforming", IEEE Vehicular Technology Conference, Sep., 2000, pp. 2414–2421, vol. 5.*

Yuval Shalom, "Wiseband–Leading the Digital Revolution in Power Amplifiers", www.wiseband.com/solutions.htm, pp. 1–6, Mar./Apr. 2000.

* cited by examiner

*Primary Examiner*—Gregory C. Issing
(74) *Attorney, Agent, or Firm*—Scully, Scott, Murphy & Presser

(57) ABSTRACT

A means and method to increase the beam traffic capacity, especially in high user density regions, of a multi-beam antenna communication system with multiple signals at any frequency transmitted (received) when in a transmit (receive) mode by canceling interference with neighboring signals. An interference cancellation network is provided for canceling the interference caused by the sidelobe(s) of at least one signal with one or more of the other signals in the network. Each power divider divides its input signal into one reference fractional signal and at least one non-reference fractional signal. Phase shifters/attenuators shift the phase and attenuate the amplitude of at least one of the non-reference fractional signals. Each power combiner combines its input reference fractional signal with at least one non-reference fractional signal into a composite signal emerging from the combiner. The phase/attenuation settings are selected to optimize the signal to interference ratio for each communications link.

40 Claims, 13 Drawing Sheets

MULTI-BEAM ANTENNA WITH INTERFERENCE CANCELLATION NETWORK

BACKGROUND OF THE INVENTION

The present invention relates to antenna systems and more specifically to multi-beam antenna communication systems.

Pre-distortion networks are known in the art to improve the self-interference or carrier to interference (C/I) ratio of amplifiers. Multi-beam antenna (MBA) arrays also are well known in the art. The power in the sidelobes of beams in a multi-beam antenna array which are operating at the same frequency as an intended signal interfere with the intended signal. This interference limits the proximity of co-frequency beams. There is also interference which is attributable to adjacent frequency channels, albeit typically at a lower intensity, and it is referred to therefore as adjacent channel interference. Interference from adjacent channels limits the proximity of beams on channels operating at adjacent frequencies. Utilization studies show that in typical applications, the C/I ratio caused by the sidelobes is the largest source of self-interference.

In the transmit mode, the signal received by any particular remote user is the sum of the intended signal for that remote user, which is contained in a beam pointing towards that remote user, and the signals intended for other remote users, which interfere with the intended signal. These interfering signals reach the remote user through the sidelobes of beams pointing towards other remote users. In the receive mode, each beam of the receive antenna collects a signal from at least one remote user and the sidelobes of each beam collect signals from other remote users which act as interference to the intended signal in the beam.

What is needed is an interference cancellation network for a multi-beam antenna to permit more capacity to be focussed into high user density regions.

SUMMARY OF THE INVENTION

In the present invention, a network is disclosed for increasing the beam traffic capacity of a multi-beam antenna system. The multi-beam antenna system comprises a plurality of signals at any frequency transmitted when the multi-beam antenna is used as a transmit antenna, and signals at any frequency received when the multi-beam antenna is used as a receive antenna, the multi-beam antenna of the multi-beam antenna system transmitting in the transmit mode and receiving in the receive mode a plurality of beams having at least one sidelobe causing interference with at least one of the plurality of signals. The plurality of beams having at least one sidelobe cause interference with at least one of the plurality of signals therein defining at least one antenna sidelobe. The multi-beam antenna system comprises an interference cancellation means for canceling the interference with at least one signal caused by the at least one antenna sidelobe.

In particular, the network increases the beam traffic capacity in a region around any remote user, the size of the region being on the order of 3 to 5 beam widths in any direction from the remote user.

When the multi-beam antenna is used as a transmit antenna, and at least one of the plurality of beams transmitted by the multi-beam antenna is pointed towards at least one remote user, the interference cancellation means has an input port for each of the plurality of signals, the interference cancellation means creates a plurality of composite signals, and the interference cancellation means has an output port for each of the composite signals. The transmit antenna has an input port connected to each output port of the interference cancellation means such that the composite signals become the input signals to the transmit multi-beam antenna, and the composite signals emerging from the interference cancellation means optimize the signal to interference ratio at the at least one remote user.

When the multi-beam antenna is used as a receive antenna, each beam of the receive antenna collects a signal, referred to as the intended signal, from at least one remote user, the sidelobe of at least one beam collecting at least one signal from at least one other remote user, and the signal from the at least one other remote user causes interference to the intended signal in the beam. The receive antenna has for each beam an output port which is connected to an input port of the interference cancellation means such that both the intended signal and the interference emerging from each output port of the receive multi-beam antenna are injected into the interference cancellation means at the input port.

The interference cancellation means creates a plurality of composite signals. The interference cancellation means has an output port for each of the composite signals, and the composite signals emerging from the output port of the interference cancellation means optimize the signal to interference ratio of the at least one intended signal collected from the at least one remote user.

Specifically, when the interference cancellation means is a network in a transmit multi-beam antenna system, the interference cancellation means comprises a plurality of power dividers and a plurality of power combiners. Each power divider has an input port connected to the transmit signal intended to be transmitted by the transmit multi-beam antenna system, and each power divider divides the signal connected to the input port into one reference fractional signal and at least one non-reference fractional signal, therein defining the power divider as a source power divider to the one reference fractional signal and to the at least one non-reference fractional signal. The source power divider has a plurality of output ports, and an output port of the source power divider containing the reference fractional signal is connected to an input port of one of the power combiners, therein defining the power combiner as a companion power combiner to the source power divider. Each output port of the source power divider containing a non-reference fractional signal is connected to an input port of another one of the power combiners, therein defining the another one of the power combiners as an associated power combiner to the source power divider. Each companion power combiner receives the at least one non-reference fractional signal through a path connecting from the source power divider of the at least one non-reference fractional signal, therein defining the source power divider of the at least one non-reference fractional signal as an associated power divider to the companion power combiner. Each of the companion power combiners combine the reference fractional signal emerging from the companion source power divider with the at least one non-reference fractional signal from an associated power divider into a composite output signal, wherein an output port of each of the power combiners is connected to an input port of the transmit multi-beam antenna such that the composite signals emerging from the interference cancellation means at the output ports of each of the power combiners become the signals transmitted at any frequency when the multi-beam antenna is used as a transmit antenna.

Again specifically, when the interference cancellation means is a network in a receive multi-beam antenna system, the interference cancellation means comprises a plurality of power dividers and a plurality of power combiners. Each power divider has an input port connected to an output port of the receive multi-beam antenna, such that the signals at any frequency received when the multi-beam antenna is used as a receive antenna become the input signals to the interference cancellation network. Each of the power dividers divide the signal connected to the input port into one reference fractional signal and at least one non-reference fractional signal, therein defining the power divider as a source power divider to the one reference fractional signal and to the at least one non-reference fractional signal. The source power divider has a plurality of output ports, and an output port of the source power divider containing the reference fractional signal is connected to an input port of one of the power combiners, therein defining the power combiner as a companion power combiner to the source power divider. Each output port of the source power divider containing a non-reference fractional signal is connected to an input port of another one of the power combiners, therein defining the another one of the power combiners as an associated power combiner to the source power divider. Each companion power combiner receives the at least one non-reference fractional signal through a path connecting from the source power divider of the at least one non-reference fractional signal, therein defining the source power divider of the at least one non-reference fractional signal as an associated power divider to the companion power combiner. Each of the companion power combiners combines the reference fractional signal emerging from the companion source power divider with the at least one non-reference fractional signal from an associated power divider into a composite output signal. A composite output signal emerges from an output port of each power combiner of the interference cancellation network, and each output port of each of the power combiners of the interference cancellation network is an output port of the receive multi-beam antenna system, such that the composite output signal of the interference cancellation network is an output signal of the receive multi-beam antenna system In any case, the multi-beam antenna can be an active phased array antenna or a reflector class antenna with multiple feeds, particularly wherein either each of the multiple feeds are independent and they each create one beam or the feeds are combined in clusters to create beams. Also, the dividing means can comprise a reciprocal combining means or the combining means can comprise a reciprocal dividing means.

In most cases, attenuating means are included for attenuating the amplitude of at least one of the non-reference fractional signals to achieve the desired amplitude relative to at least one of the reference fractional signals. As well, attenuating means can be included for attenuating the amplitude of the reference fractional signal.

Again in most cases, phase shifting means are included for shifting the phase of at least one of the plurality of non-reference fractional signals to achieve the desired phase relative to at least one of the reference fractional signals. As well, phase shifting means can be included for shifting the phase of the reference fractional signal.

The attenuating means can be included with one of the (a) combining means, and (b) dividing means. Similarly, the phase shifting means can be included with one of the (a) combining means, and (b) dividing means.

The present invention also discloses a method for increasing the beam traffic capacity of a multi-beam antenna transmitting a plurality of beams operating at any frequency, with at least one of the plurality of beams pointed toward a remote user, and at least one other of the plurality of beams having at least one sidelobe directed towards the remote user causing interference at the remote user with the signal contained in the beam pointed toward the remote user. The method is performed by means of the interference cancellation network discussed previously, which has as input a plurality of transmit signals each intended to correspond to one of the plurality of beams operating at any frequency. The interference cancellation network comprises a plurality of dividers and a plurality of combiners, with each of the plurality of dividers having a companion combiner and at least one associated combiner, and each of the plurality of combiners having a companion divider and at least one associated divider, and each of the dividers having an input port for one of the plurality of transmit signals. The method comprises the steps of: (a) applying each of the plurality of transmit signals to the input ports of each of the dividers, (b) dividing in each of the dividers each of the transmit signals into a reference fractional signal and at least one non-reference fractional signal, the reference fractional signal and the non-reference fractional signal therein each having a common source divider, (c) transporting the reference fractional signal to the companion combiner of the common source divider, (d) transporting at least one non-reference fractional signal to one of the at least one associated combiners of the common source divider, and (e) combining in each of the companion combiners the one reference fractional signal from the companion divider with the at least one non-reference fractional signal from the at least one associated divider into a composite signal, the composite signal thereby optimizing the signal to interference ratio at the remote user.

The present invention discloses a method for increasing the beam traffic capacity of a multi-beam antenna receiving a plurality of beams operating at any frequency, the multi-beam antenna having a receive signal output port for each of the plurality of beams operating at any frequency, with at least one of the plurality of beams collecting an intended signal from at least one remote user, the at least one of the plurality of beams having at least one sidelobe collecting at least one signal from at least one other remote user, and the at least one signal from the at least one other remote user acting as interference to the intended signal emerging from the output port of the multi-beam receive antenna associated with the at least one beam collecting an intended signal from the at least one remote user. The method is again performed by means of the interference cancellation network previously discussed, which has as input a plurality of receive signals emerging from the output ports of the receive multi-beam antenna. The interference cancellation network comprises a plurality of dividers and a plurality of combiners, each of the plurality of dividers has a companion combiner and at least one associated combiner, each of the plurality of combiners has a companion divider and at least one associated divider, and each of the dividers has an input port for one of the output receive signals corresponding to one of the plurality of beams received by the multi-beam antenna. The method comprises the steps of: (a) applying each of the receive signals emerging from the output ports of the receive multi-beam antenna to the input ports of each of the dividers, (b) dividing in each of the dividers each of the receive signals into a reference fractional signal and at least one non-reference fractional signal, the reference fractional signal and the non-reference fractional signal therein each having a common source divider, (c) transporting the reference fractional signal to the companion combiner of the common source divider, (d) transporting the at least one non-reference fractional signal to one of the at least one associated combiners of the common source divider, and (e) combining in each of the companion combiners the one reference fractional signal from the companion divider with the at least one non-reference fractional signal from the at least one associated divider into a composite signal, the composite signal thereby optimizing the signal to interference ratio of the intended signal collected from the at least one remote user.

For either the transmit mode or the receive mode, the method in most cases includes, following the step of dividing in each of the dividers each of the signals into a reference fractional signal and at least one non-reference fractional signal, the step of attenuating the amplitude of the at least one of the plurality of non-reference fractional signals to achieve the desired amplitude relative to at least one of the reference fractional signals. Also, in most cases, following the step of dividing in each of the dividers each of the signals into a reference fractional signal and at least one non-reference fractional signal, the method includes the step of shifting the phase of the at least one of the plurality of non-reference fractional signals to achieve the desired phase relative to the phase of at least one of the reference fractional signals.

The method can be applied to a multi-beam antenna which is an active phased array antenna. Also, the method can be applied to a multi-beam antenna which is a reflector class antenna with multiple feeds, particularly wherein either each of the multiple feeds are independent and they each create one beam or the feeds are combined in clusters to create beams. In particular, the method increases the beam traffic capacity in a region around any remote user, the size of the region being on the order of 3 to 5 beam widths in any direction from the remote user.

DETAILED DESCRIPTION OF EXEMPLARY EMBODIMENTS

Figure 1A:
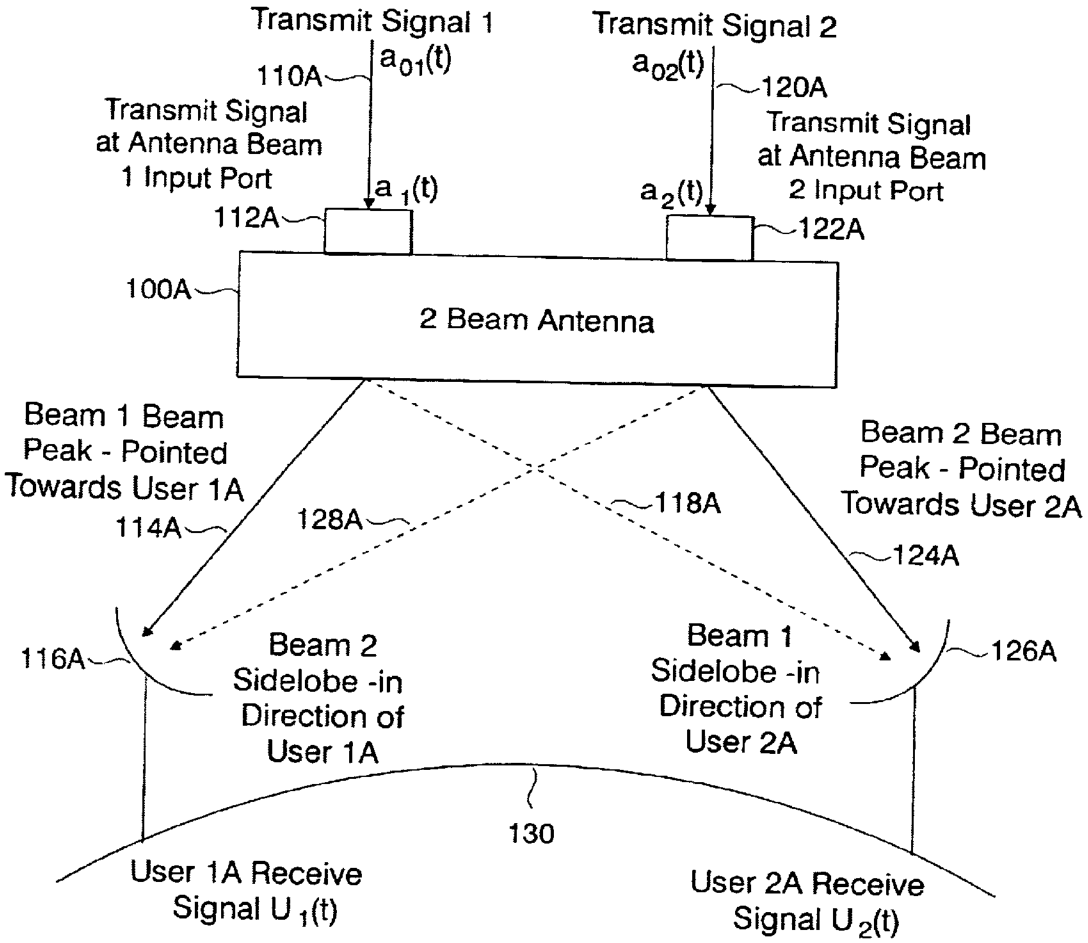
FIG. 1A (Prior Art)
FIG. 1A is a schematic diagram example of a two-beam transmit antenna system of the prior art.

The present invention improves the intended signal power to interference power ratio (SIR) (or carrier to interference power ratio {C/I}) of any type of multi-beam antenna system thus allowing more beams to be simultaneously pointed at high user density regions. This increases the revenue-generating capability of the multi-beam antenna system.

This invention also improves the C/I ratio for all ground stations located within a cell close to the beam peak, so that the signal strength is approximately the same for all of the ground stations.

This invention is intended to apply to any type of multi-beam antenna, including both transmit and receive antennas. Typically, the invention is applied when the interference remains relatively constant with time, such as over a period of days. Two examples include a complete multi-beam active phased array antenna that has a beam-forming network, and a reflector class antenna with multiple independent feeds where each feed creates one beam.

In particular, in the present invention, a network is disclosed for increasing the beam density (traffic capacity into a high user density region) of a multi-beam antenna system operating at any frequency. The multi-beam antenna system transmits/receives a plurality of signals at any frequency, which are either transmitted to remote users when the multi-beam antenna is used as a transmit antenna, or received from remote users when the multi-beam antenna is used as a receive antenna. The antenna beam pattern associated with each signal has one or more sidelobes, which interfere with at least one other of the plurality of signals. The antenna system includes an interference cancellation network to cancel the interference caused by the antenna sidelobes.

In a typical transmit application to which this invention may be advantageously applied there are a series of spatially separated remote users receiving different signals from a single multi-beam transmit antenna. For the sake of clarity an implementation with only one remote user per transmit antenna beam will be described. [Well known techniques such as frequency division multiple access (FDMA), code division multiple access (CDMA) or time division multiple access (TDMA) can be used to support multiple remote users located in each beam. Beams in a standby mode not serving any remote users can be ignored without loss of generality].

One beam of the transmit multi-beam antenna is pointed towards each of the remote users. The signal intended for a particular remote user is applied to the input port of the multi-beam antenna sub-system associated with the beam pointing towards the remote user. It is desired that each remote user receives only its intended signal and that it receives none of the signal power intended for other remote users. An ideal multi-beam transmit antenna implementation would create antenna beams of negligible width and with negligible sidelobes. Such an ideal antenna would have the desired property that the signal received by each remote user would replicate the signal intended for the remote user. In this case the signal received by the remote user is not corrupted by interference from the other signals transmitted to the other remote users. If the remote users are relatively far apart a practical multi-beam antenna can come close to this ideal.

Practical multi-beam antennas have finite beamwidths and finite sidelobes associated with each beam. In applications using such a practical multi-beam antenna, where some of the other remote users are relatively close to the remote user, the remote user will be located in the finite sidelobes associated with the beams which are pointed towards the other nearby remote users. In this case the signal present at the remote user will be a combination of the signal power intended for the remote user and signal power intended for other nearby remote users. The total combined power present at the remote user intended for other nearby remote users is referred to as the interference power at the remote user. If the ratio of the intended received signal power to the interference power at the remote user is too low, acceptable communications quality will not be achieved for the remote user. The purpose of the invention as applied to a transmit subsystem is to improve the signal to interference power ratio of signals received at remote users served by a multi-beam antenna system. This will result in acceptable communications quality when multiple remote users are located in close proximity to each other.

The invention as applied to a transmit subsystem comprises a means for connecting each of the plurality of signals, which it is desired to transmit through the multi-beam antenna to remote receive stations, to a means for dividing each signal into a plurality of fractional signals, where one of the plurality of fractional signals (per signal intended for transmission) acts as a reference fractional signal. The remainder of the fractional signals emerging from the dividing means are referred to as non-reference fractional signals. In addition, there are connecting means for connecting the plurality of fractional signals emerging from the plurality of dividing means to a plurality of combining means. A divider and a combiner that are connected through a reference fractional signal path are referred to as a companion divider and a companion combiner. A divider and a combiner that are connected through a non-reference fractional signal path are referred to as a companion divider and an associated combiner or a companion combiner and an associated divider. The connections between the plurality of dividing means and the plurality of combining means are arranged so that each combining means is connected to no more than one fractional signal created by any one of the plurality of dividing means. Furthermore each of the plurality of combining means is connected to exactly one of the reference fractional signals. The connection means (between the dividing and combining means) for all fractional signals other than the reference fractional signal includes typically a phase/amplitude control circuit. The connection means (between the dividing and combining means) for the reference fractional signals does not need to include a phase/amplitude control circuit. However, a phase/amplitude control circuit may be included to make all paths identical for design and/or manufacturing convenience. As is obvious to those skilled in the art, although not likely, it can occur that one or more of the fractional signals inherently possesses substantially the desired amplitude and phase angle relative to the reference fractional signal, and so even if an attenuator and/or phase shifter are not provided, essentially no adjustment is required. However, typically, it is anticipated that the inherent phase angle and amplitude of a plurality of the fractional signals will deviate from the reference fractional signal such that adjustment in amplitude and phase angle is required. Also, as is obvious to those skilled in the art, either the combiner means or the divider means can be designed to incorporate one or more phase shifters and/or amplitude attenuators into a single unit that performs any desired combination of combining/dividing and phase shifting/attenuating. The plurality of combiner means are used to create a plurality of composite transmit signals by combining one reference fractional signal with one or more non-reference fractional signals. These composite transmit signals are applied to the input ports of the multi-beam antenna. The composite transmit signal containing the reference fractional signal created by the dividing means associated with the intended signal for a specific remote user is applied to the input port of the multi-beam transmit antenna, which is associated with the antenna beam pointing towards the remote user.

The relative phase/amplitude settings of the phase/amplitude circuits in the non-reference paths are selected so that the signal received at each remote user has an improved signal to interference power ratio. This improvement in signal to interference power ratio is substantially achieved by reducing the interference power. This reduction in interference power is achieved by creating a composite transmit signal to transmit towards the remote user, which contains a copy of the signal being transmitted towards each of the other nearby remote users. The phase/amplitude settings of the phase/amplitude circuits are selected such that the copy is substantially equal in amplitude and opposite in phase to the interference signal received at the remote user resulting from the sidelobes of antenna beams pointing at other nearby remote users. So the copy and the interference signal cancel each other out at the remote user.

In a typical receive application to which this invention may be advantageously applied, there are a series of spatially separated remote users transmitting signals towards a single multi-beam receive antenna. For the sake of clarity, an implementation with only one remote user per receive antenna beam will be described. (As is the case for the transmit mode, well known techniques such as FDMA, CDMA or TDMA can be used to support multiple remote users located in each beam. Beams in a standby mode not serving any remote users can be ignored without loss of generality). Also for the sake of clarity, this description of the invention will not discuss the impacts of thermal noise, which are well known to those skilled in the art.

Each beam of the receive antenna is pointed towards its associated remote user. It is desired that each output port of the multi-beam antenna system contains power from one and only one remote user to permit clear reception of these signals. An ideal multi-beam receive antenna implementation would create antenna beams of negligible width and with negligible sidelobes. Such an ideal antenna would have the desired property that the signal present at each output port of the receive multi-beam antenna would replicate the signal transmitted by the remote user located in the antenna beam associated with the antenna port and it would not contain any signal power from any of the other remote users.

In this case the received signal from the remote user is not corrupted by interference from the other signals transmitted by the other remote users. If the remote users are relatively far apart, a practical multi-beam antenna can come close to this ideal.

Practical multi-beam antennas have finite beamwidths and finite sidelobes associated with each beam. In applications using such a practical multi-beam antenna, where some of the other remote users are relatively close to the remote user, some of the other remote users will be located in the finite sidelobes associated with the beam which is pointed towards the remote user. In this case the signal present at the output port of the receive multi-beam antenna will be a combination of the desired received power from the remote user and power from some of the other nearby remote users. The total combined power present in the output port of the multi-beam antenna coming from the other remote users is referred to as the interference power at this port. If the ratio of the desired received signal power to the interference power is too low, acceptable communications quality will not be achieved for the desired remote user. The purpose of the invention as applied to a receive subsystem is to improve the signal to interference power ratio of the outputs of a receive multi-beam antenna system. This will result in acceptable communications quality when multiple remote users are located in close proximity to each other. The manner in which the invention is applied to a receive subsystem is very similar to the manner in which it is applied to a transmit subsystem. It comprises a means for connecting each of the plurality of signals, which have been received through the multi-beam antenna, to a means for dividing each received signal into a plurality of fractional signals, where one of the plurality of fractional signals (i.e., the fractional signals of a single received signal) acts as a reference fractional signal. Again, the remainder of the fractional signals emerging from the dividing means are referred to as non-reference fractional signals. In addition, there are connecting means for connecting the plurality of fractional signals emerging from the plurality of dividing means to a plurality of combining means. A divider and a combiner that are connected through a reference fractional signal path are referred to as a companion divider and a companion combiner. A divider and a combiner that are connected through a non-reference fractional signal path are referred to as a companion divider and an associated combiner or a companion combiner and an associated divider. The connections between the plurality of dividing means and the plurality of combining means are arranged so that each combining means is connected to no more than one fractional signal created by any one of the plurality of dividing means. Furthermore each of the plurality of combining means is connected to exactly one of the reference fractional signals. The connection means (between the dividing and combining means) for all fractional signals other than the reference fractional signals includes a phase/amplitude control circuit. As is the case for the transmit mode, in the receive mode, it is not required that the connection means (between the dividing and combining means) for the reference fractional signals include a phase and/or amplitude control circuit. However, a phase and/or amplitude control circuit may be included to make all paths identical for design and/or manufacturing convenience. As is obvious to those skilled in the art, in certain cases, it can occur that one or more of the fractional signals inherently possesses substantially the desired amplitude and phase angle relative to the reference fractional signal, and so even if an attenuator and/or phase shifter are not provided, essentially no adjustment is required. However, typically, it is anticipated that the inherent phase angle and amplitude of a plurality of the fractional signals will deviate from the reference fractional signal such that adjustment in amplitude and phase angle is required. The plurality of combiner means are used to create a plurality of composite received signals by combining one reference fractional signal with one or more non-reference fractional signals.

The relative phase/amplitude settings of the phase/amplitude circuits in the non-reference paths are selected so that the composite received signals present at the outputs of the plurality of combiner networks have improved signal to interference power ratios compared to the plurality of signals at the outputs of multi-beam receive antenna. This improvement in signal to interference power ratio is substantially achieved by reducing the interference power. This reduction in interference power is achieved by selecting the composite amplitude/phase of the fractional non-reference partial signals connected to the combiner means to be substantially equal in amplitude and opposite in phase to the interference power present in the reference signal connected to the combiner means.

For both the transmit mode and the receive mode, the reference fractional signal which is connected directly to a companion combiner represents typically a substantial fraction of the total power of the signal that emerges from the combiner. The non-reference fractional signals passing through an attenuator/phase shifter typically are of significantly lower power than the power of the reference fractional signal connected directly to the same combiner. The reference fractional signal that is connected directly to a combiner is selected to act as a reference signal. The amplitude and phase of the non-reference fractional signals that do pass through an attenuator/phase shifter can be modulated relative to the reference fractional signal to cancel the interference created by the antenna sidelobes. This identical pattern can be extrapolated for cancellation networks and multi-beam antenna systems having entirely different numerical characteristics with respect to the numbers of beams and groups of signals at a common frequency.

Using the network above, in the present invention, a method for increasing the beam traffic capacity of a multi-beam antenna system is disclosed. The invention applies to all types of multi-beam antennas. In particular it applies to multi-beam active phased array antennas. The multi-beam antenna can also be a reflector class antenna with multiple independent feeds, with each of the multiple independent feeds creating one beam.

In the present invention, where communication is from/to a single ground station or group of ground stations per beam, an interference cancellation network is connected to a prior art multi-beam antenna to create a multi-beam antenna system, with any number of beams split between any number of co-frequency groups. For example, a 16 beam multi-beam antenna may be fed by four interference cancellation networks, each of which supports four beams. For the sake of simplicity, the interference cancellation networks will be referred to simply as cancellation networks. Each cancellation network handles one set of four (4) co-frequency beams and injects a portion of the signal intended for/coming from each remote user into each of the beams operating at the same frequency. For a transmit application the magnitude and phase of the signal for remote user i injected into the beam pointed at remote user j is selected to cancel the interference created by the sidelobe of beam i at remote user j. The amplitude and phase of the signal intended for remote user j serves as a reference for modulating the amplitude and phase of the fraction of the signal for remote user i injected into the beam pointing to remote user j. In some applications there may be multiple ground stations which are intended to receive signal j. If this is the case it is assumed that they are located near the peak of the main lobe of the beam j, e.g., within approximately the 1 dB beam width. In applications where there are multiple ground stations receiving signal j, the magnitude and/or phase of signal i injected into beam j is selected to provide the best aggregate cancellation at all of the one or more ground stations j. Within the interference cancellation network itself, the attenuator/phase shifter circuits in conjunction with the power dividers/combiners permit a controlled fraction of the signal present in each beam to be injected into each of the other beams. In systems using digital signal processing and/or digital beam-forming, the interference cancellation can be implemented digitally.

Figure 1B:
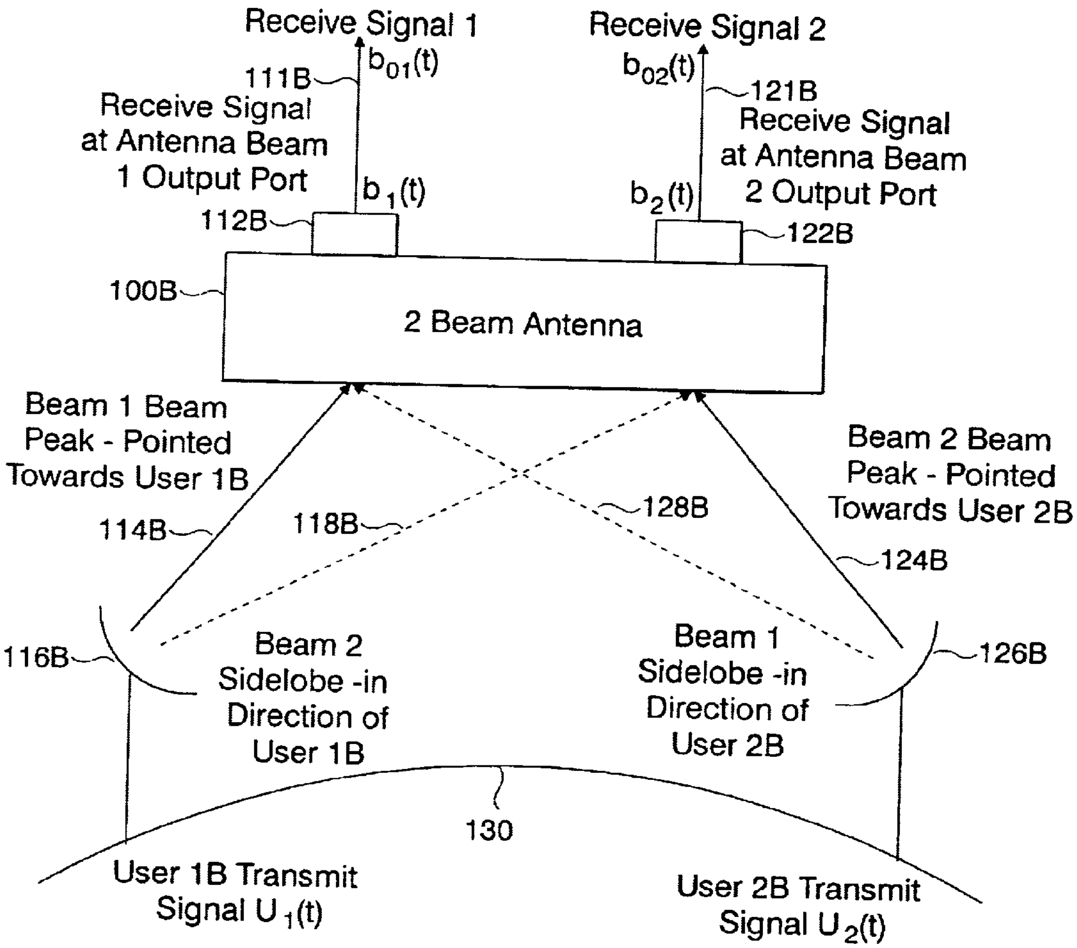
FIG. 1B (Prior Art)
FIG. 1B is a schematic diagram example of a two-beam receive antenna of the prior art.

FIG. 1A and FIG. 1B illustrate conventional two-beam antenna satellite systems of the prior art. FIG. 1A represents the case when a multi-beam antenna 100A is used as a transmit antenna. FIG. 1B represents the case when multi-beam antenna 100B is used as a receive antenna. FIG. 1A shows that co-frequency transmit signals 110A, 120A at the input ports 112A, 122A of beams 114A, 124A are emitted by multi-beam antenna 100A and that beams 114A, 124A are directed towards User 1A 116A and User 2A 126A, respectively. Interference signal 118A containing the signal 110A is emitted by multi-beam antenna 100A through the sidelobe of beam 114A which is pointed in the direction of User 2A 126A. Interference signal 128A is emitted by multi-beam antenna 100A through the sidelobe of beam 124A which is pointed in the direction of User 1A 116A.

When considering FIG. 1B, those skilled in the art will recognize that for receive antennas, the terms “directed towards” or “pointed towards” a particular user are employed verbally even though the direction of energy flow is actually away from the particular user. However, graphically, signals and beams are illustrated as pointing in the direction of energy flow. FIG. 1B shows that co-frequency received signals 111B, 121B at the output ports 112B, 122B of beams 114B, 124B are received by multi-beam antenna 100B from User 1B 116B and from User 2B 126B, respectively. Interference signal 118B created by User 1B 116B is received through the sidelobe of beam 124B which is directed towards User 1B 116B. Interference signal 128B is received through the sidelobe of beam 114B which is directed towards User 2B 126B.

With respect to FIG. 1A and FIG. 1B, User 1A 116A, User 1B 116B, User 2A 126A and User 2B 126B are illustrated by way of example and not by way of limitation as ground stations on the surface of the earth 130.

Figure 2A:
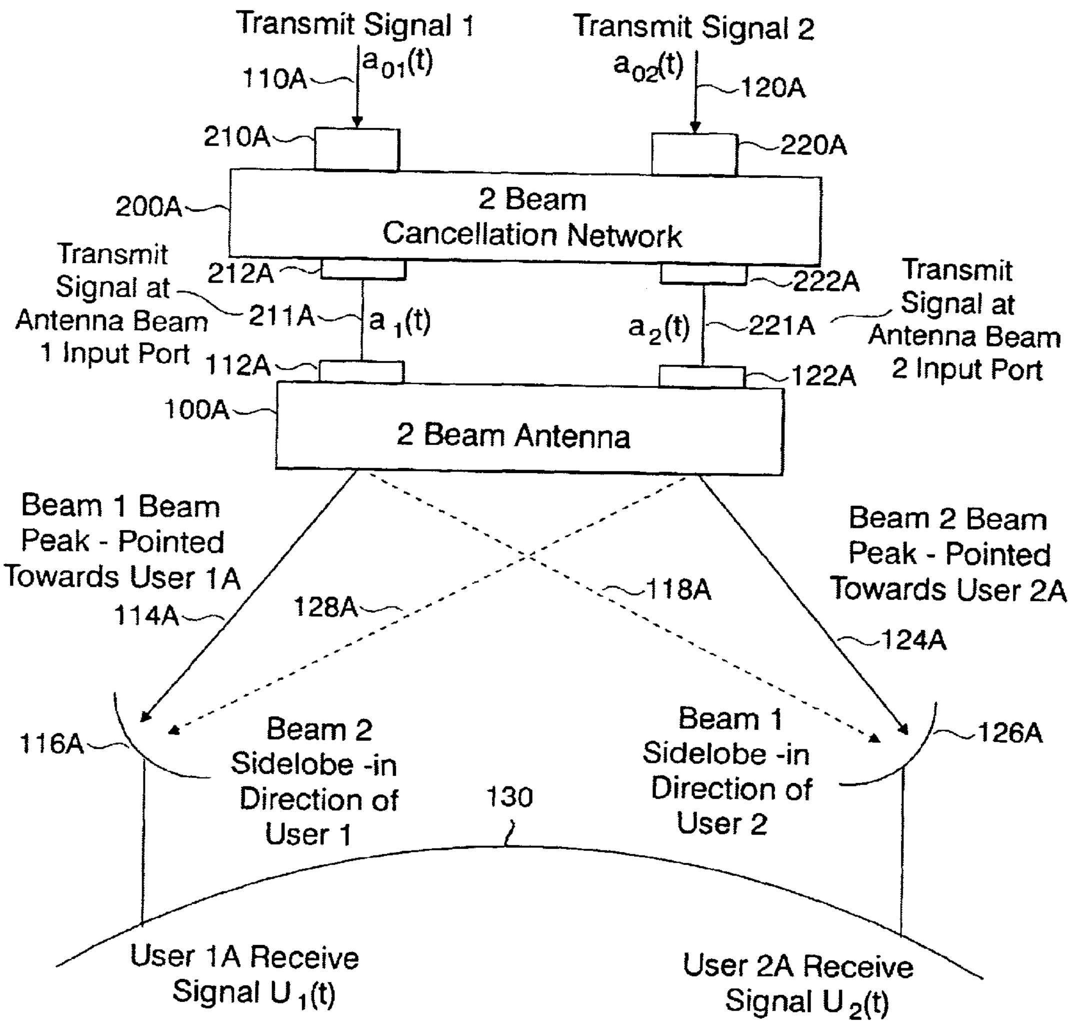
FIG. 2A is a schematic diagram example of a two-beam transmit subsystem with the interference cancellation network of the present invention connected to a two beam transmit antenna of the prior art.
Figure 2B:
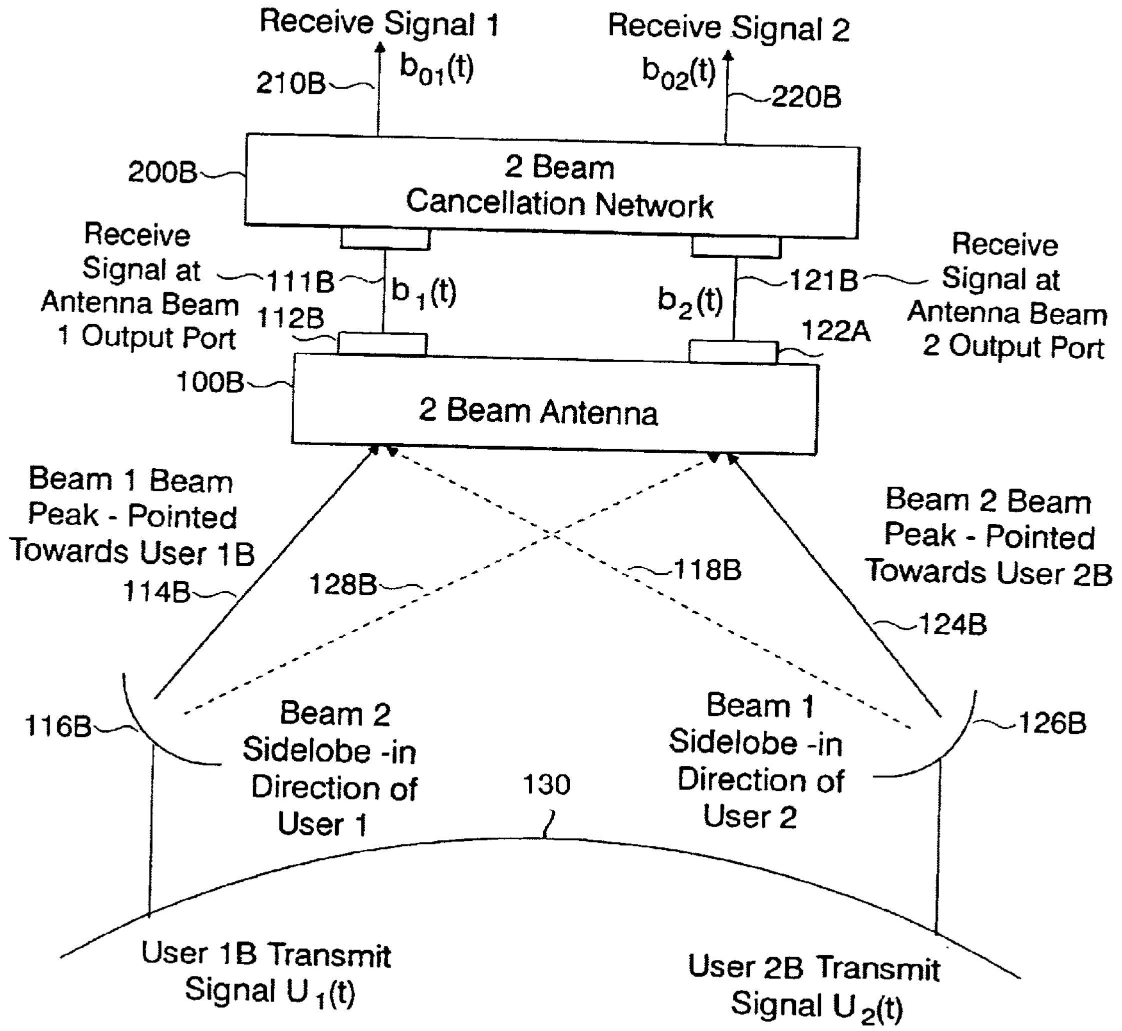
FIG. 2B is a schematic diagram example of a two-beam receive subsystem with the interference cancellation network of the present invention connected to a two beam receive antenna of the prior art.

FIG. 2A and FIG. 2B illustrate the present invention. In both cases a cancellation network is connected to a conventional two-beam antenna of the prior art (multi-beam transmit antenna 100A and multi-beam receive antenna 100B, respectively). FIG. 2A shows that co-frequency transmit signals 110A, 120A enter a 2-beam interference cancellation network 200A at signal input ports 210A, 220A and emerge as signals 211A, 221A from signal output ports 212A, 222A and are connected to the input ports 112A, 122A of beams 114A, 124A, respectively. Beams 114A, 124A are emitted from multi-beam transmit antenna 100A and are directed towards User 1A 116A and User 2A 126A, respectively. Interference signal 118A containing the signal 211A is emitted by multi-beam transmit antenna 100A through the sidelobe of beam 114A which is pointed in the direction of User 2A 126A. Interference signal 128A containing the signal 221A is emitted by antenna 100A through the sidelobe of beam 124A which is pointed in the direction of User 1A 116A.

As is the case for FIG. 1B, when considering FIG. 2B, those skilled in the art will recognize that for receive antennas, the terms “directed towards” or “pointed towards” a particular user are employed verbally even though the direction of energy flow is actually away from the particular user. However, graphically, signals and beams are illustrated as pointing in the direction of energy flow. FIG. 2B shows that received signals 210B, 220B emerge from 2-beam interference cancellation network 200B, having originated as co-frequency signals 111B, 121B from the output ports 112B, 122B of beams 114B, 124B, respectively. Beams 114B, 124B are received by antenna 100B from User 1B 116B and from User 2B 126B, respectively. Interference signal 118B created by User 1B 116B is received through the sidelobe of beam 124B which is directed towards User 1B 116B. Interference signal 128B is received through the sidelobe of beam 114B which is directed towards User 2B 126B.

The basic principles of operation of the prior art and of the present invention are illustrated by way of example in the following comparative analysis between the two-beam antenna system in the transmit mode of the prior art, as shown in FIG. 1A, and the two-beam antenna system in the transmit mode of the present invention, as shown in FIG. 2A.

Let $a_1(t)$=the waveform 211A at the beam 1 input port 112A to multi-beam transmit antenna 100A established as an array antenna.

Let $a_2(t)$=the waveform 221A at the beam 2 input port 122A to multi-beam transmit antenna 100A established as an array antenna.

Let $a_{01}(t)$=the waveform 110A at the transmit signal 1 input port 210A to the cancellation network 200A.

Let $a_{02}(t)$=the waveform 120A at the signal 2 input port 220A to the cancellation network 200A.

Then the received signal, $U_1(t)$, at User 1A 116A is $$U_1(t)=a_1(t)+\langle x_1/x_2\rangle a_2(t) \tag{1}$$

where $\langle x_1/x_2\rangle$ is the gain of the sidelobe 128A of beam 2 124A in the direction of User 1A 116A normalized to the gain of beam 1 114A in the direction of User 1A 116A.

As illustrated in FIG. 1A, in a conventional 2-beam antenna system for multi-beam transmit antenna 100A, since there is no cancellation network, transmit signal 110A, represented by $a_{01}(t)=a_1(t)$ and transmit signal 120A, represented by $a_{02}(t)=a_2(t)$, operate at a common frequency and are both applied directly to antenna beam input ports 112A and 122A, respectively, and the signal to interference ratio at User 1A 116A is $1/\langle x_1/x_2\rangle$. Therefore, $U_1(t)$ depends on $a_{02}(t)$, which represents interference with beam 1 114A. An analogous result can be obtained for $U_2(t)$.

The purpose of the present invention is to improve the signal to interference ratio at all users. This allows the beams to be placed closer together, which allows more capacity to be focused into a small area which in turn increases the revenue generating capability of the communications system.

In FIG. 2A, co-frequency signals 110A and 120A represent information that is to be transmitted to User 1A 116A and User 2A 126A respectively. Signals 110A and 120A may be generated on the satellite (not shown) to which multi-beam transmit antenna 100A is mounted or they may be generated on the ground 130 and uplinked to multi-beam transmit antenna 100A on the satellite. The cancellation network 200A is used to inject a small fraction of signal 2 120A into beam 1 114A. The amplitude and phase of the injected signal are selected to substantially match the amplitude and to substantially counter the phase of the interfering signal to cancel it. In particular, the ideal goal for the injected signal is to be exactly equal in magnitude and exactly opposite in sign (phase) to the interference generated by the sidelobe 128A of beam 2 124A in the direction of User 1A 116A.

$$a_1(t)=a_{01}(t)-\langle x_1/x_2\rangle a_{02}(t) \quad (2)$$

and $$a_2(t)=a_{02}(t)-\langle x_2/x_1\rangle a_{01}(t) \quad (3)$$

Substituting into equation (1):

$$\begin{aligned} U_1(t) &= a_{01}(t) - \langle x_1/x_2\rangle a_{02}(t) + \langle x_1/x_2\rangle[a_{02}(t) - \langle x_2/x_1\rangle a_{01}(t)] \quad (4) \\ &= a_{01}(t)(1 - \langle x_1/x_2\rangle\langle x_2/x_1\rangle) \end{aligned}$$

It can be seen that $U_1(t)$ only includes terms based on $a_{01}(t)$ and none based on $a_{02}(t)$. So, in this simple example for a transmit case, infinite signal to interference ratio has been achieved by the use of the cancellation network 200A. Typically, significant improvement in the C/I ratio for the transmit mode can be achieved for essentially any other more complicated case encountered in actual practice, e.g. multiple beams with multiple ground stations in each beam.

In addition, the basic principles of operation of the prior art and the present invention are illustrated by way of example in the following comparative analysis between the two-beam antenna system in the receive mode of the prior art, as shown in FIG. 1B, and the two-beam antenna system in the receive mode of the present invention, as shown in FIG. 2B.

Assume:

$U_1(t)$=signal transmitted by User 1B 116B.

$U_2(t)$=signal transmitted by User 2B 126B.

$b_1(t)=U_1(t)+\langle y_2/y_1\rangle U_2(t)$=the signal 111B at the beam 1 output port 112B of multi-beam receive antenna 100B. (5)

$b_2(t)=U_2(t)+\langle y_1/y_2\rangle U_1(t)$=the signal 121B at the beam 2 output port 122B of multi-beam receive antenna 100B. (6)

where $\langle y_1/y_2\rangle$=the gain of sidelobe 118B of beam 2 124B in the direction of User 1B 116B normalized to the gain of beam 2 124B in the direction of User 2B 126B.

and $\langle y_2/y_1\rangle$=the gain of sidelobe 128B of beam 1 114B in the direction of User 2B 126B normalized to the gain of beam 1 114B in the direction of User 1B 116B.

Note that the definitions of $\langle y_1/_2\rangle$ and $\langle y_2/y_1\rangle$ in the receive case are slightly different from the definitions of $\langle x_1/x_2\rangle$ and $\langle x_2/x_1\rangle$ in the transmit case.

As illustrated in FIG. 1B, in the conventional 2-beam receive antenna system 100B, since there is no cancellation network, signal 111B is received as $b_{01}(t)=b_1(t)$ and signal 121B is received as $b_{02}(t)=b_2(t)$, with both signals operating at a common frequency. Signal $b_1(t)$ is comprised of two components: the signal collected through the main beam 114B pointed at User 1B 116B; and the interfering signal from User 2B 126B which is received through a sidelobe 128B of the beam 1 114B antenna pattern. Since there is no cancellation network, the signal to interference ratio at multi-beam receive antenna 100B output port 112B for User 1B 116B is $1/\langle y_2/y_1\rangle$. A similar result can be demonstrated for $b_{02}(t)=b_2(t)$ and signal 121B.

In FIG. 2B, signal $b_1(t)$ is comprised of two components: the signal collected through the main beam 114B pointed at User 1B 116B; and the interfering signal from User 2B 126B which is received through sidelobe 128B of the beam 1 114B antenna pattern. The cancellation network 200B is used to inject a small fraction of the waveform collected by beam 2 121B into beam 1 111B, with both beams operating at a common frequency. The magnitude and phase of the injected signal are selected to substantially match the amplitude and to substantially counter the phase of the interfering signal to cancel it. [Although less likely, cases can occur where only the amplitude or only the phase, or neither, needs correction.]

Mathematically:

$$b_{01}(t)=b_1(t)-\langle y_2/y_1\rangle b_2(t) \quad (7)$$

and $$b_{02}(t)=b_2(t)-\langle y_1/y_2\rangle b_1(t) \quad (8)$$

Substituting gives:

$$\begin{aligned} b_{01}(t) &= U_1(t) + \langle y_2/y_1\rangle U_2(t) - \langle y_2/y_1\rangle[U_2(t) + \langle y_1/y_2\rangle U_1(t)] \quad (9) \\ &= U_1(t)(1 - \langle y_1/y_2\rangle\langle y_2/y_1\rangle) \end{aligned}$$

It can be seen that $b_{01}(t)$ only includes terms based on $U_1(t)$ and none based on $U_2(t)$. So in this simple example, an infinite signal to interference ratio has been achieved by the use of the cancellation network 200B. A similar result can be obtained for $b_{02}(t)$.

Typically, significant improvement in the C/I ratio for the receive mode can be achieved for essentially any other more complicated case encountered in actual practice, e.g., as noted previously, multiple beams with multiple ground stations in each beam.

With respect to FIG. 2A and FIG. 2B, User 1A 116A and User 2A 126A are illustrated by way of example and not by way of limitation as ground stations on the surface of the earth 130.

Figure 3A:
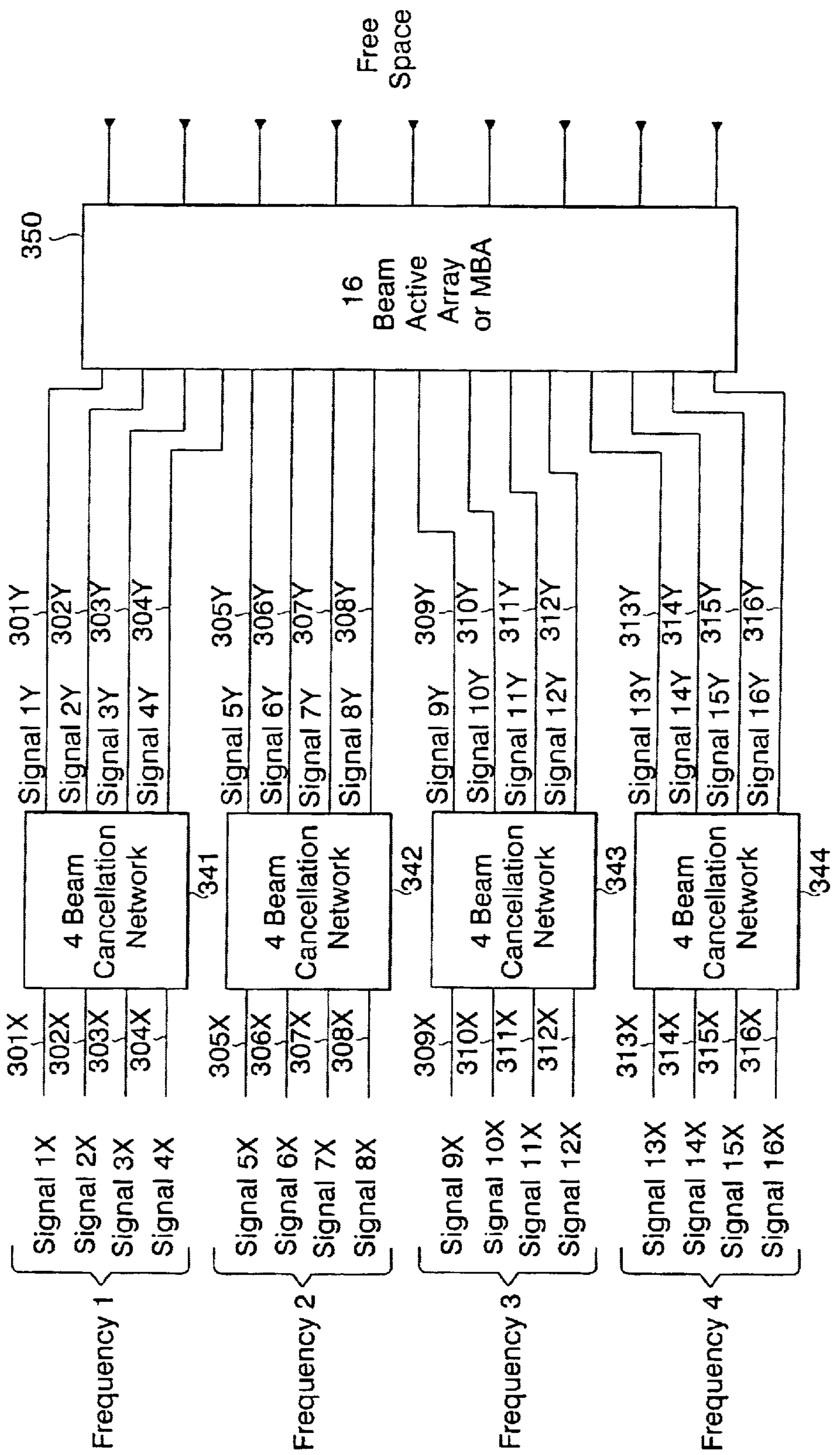
FIG. 3A illustrates a schematic block diagram of an embodiment of the present invention for a 16-beam antenna system in either a transmit mode or a receive mode.

Referring to FIG. 3A, an exemplary embodiment of the present invention is shown as an antenna system block diagram for a 16 beam antenna system. The embodiment illustrated in FIG. 3A is appropriate for applications where there are four signals at each of four operating frequencies. These are labeled frequencies 1, 2, 3 and 4. It is assumed that it is desired to operate this antenna system with four groups of four beams. All four beams within each beam group operate at the same frequency. The four beam groups all operate at different frequencies. In this exemplary application it is assumed that it is desired to minimize co-frequency interference. The embodiment in FIG. 3A may also be used to minimize both co-frequency and adjacent channel interference between the signals within each beam group. If any of the signal groups contains signals operating at more than one frequency, adjacent channel interference may also be minimized. This mode of operation will be described in the discussion of FIG. 3B below.

In the transmit mode, 16 unmodified transmit signals 301X to 316X form the input to the transmit network. Neighboring signals 301X, 302X, 303X, and 304X each operate at a pre-determined frequency 1, and each of signals 301X, 302X, 303X, and 304X are connected to a dedicated 4-beam cancellation network 341. Upon emerging from the cancellation network 341, each signal, now a composite signal designated as signal 301Y, 302Y, 303Y, and 304Y, respectively, enters the respective input port of 16-beam antenna 350.

Similarly, three other neighboring groups of four signals each are connected to a respective four-beam cancellation network and the 16-beam antenna 350. Specifically, unmodified transmit signals 305X, 306X, 307X, and 308X each operate at a pre-determined frequency 2, and each of signals 305X, 306X, 307X, and 308X are connected to a dedicated 4-beam cancellation network 342. Upon emerging from the cancellation network 342, each signal, now a composite signal designated as signal 305Y, 306Y, 307Y, and 308Y, respectively, enters the respective input port of 16-beam antenna 350.

Unmodified transmit signals 309X, 310X, 311X, and 312X each operate at a pre-determined frequency 3, and each of signals 309X, 310X, 311X, and 312X are connected to a dedicated 4-beam cancellation network 343. Upon emerging from the cancellation network 343, each signal, now a composite signal designated as signal 309Y, 310Y, 311Y, and 312Y, respectively, enters the respective input port of 16-beam antenna 350.

Finally, unmodified transmit signals 313X, 314X, 315X, and 316X each operate at a pre-determined frequency 4, and each of signals 313X, 314X, 315X, and 316X are connected to a dedicated 4-beam cancellation network 344. Upon emerging from the cancellation network 344, each signal, now a composite signal designated as signal 313Y, 314Y, 315Y, and 316Y, respectively, enters the respective input port of 16-beam antenna 350.

In the receive mode, 16 unmodified receive signals, 301Y to 316Y, are received from the respective output ports of the 16-beam antenna 350. Four unmodified signals at frequency 1, designated as 301Y to 304Y, respectively, are connected to 4-beam cancellation network 341 and emerge as composite signals 301X to 304X respectively, at frequency 1. Four unmodified signals at frequency 2, designated as 305Y to 308Y, respectively, are connected to 4-beam cancellation network 342 and emerge as composite signals 305X to 308X respectively, at frequency 2. Four unmodified signals at frequency 3, designated as 309Y to 312Y respectively, are connected to 4-beam cancellation network 343 and emerge as composite signals 309X to 312X respectively, at frequency 3. Four unmodified signals at frequency 4, designated as 313Y to 312Y respectively, are connected to 4-beam cancellation network 344 and emerge as signals 313X to 316X respectively, at frequency 4.

Figure 3B:
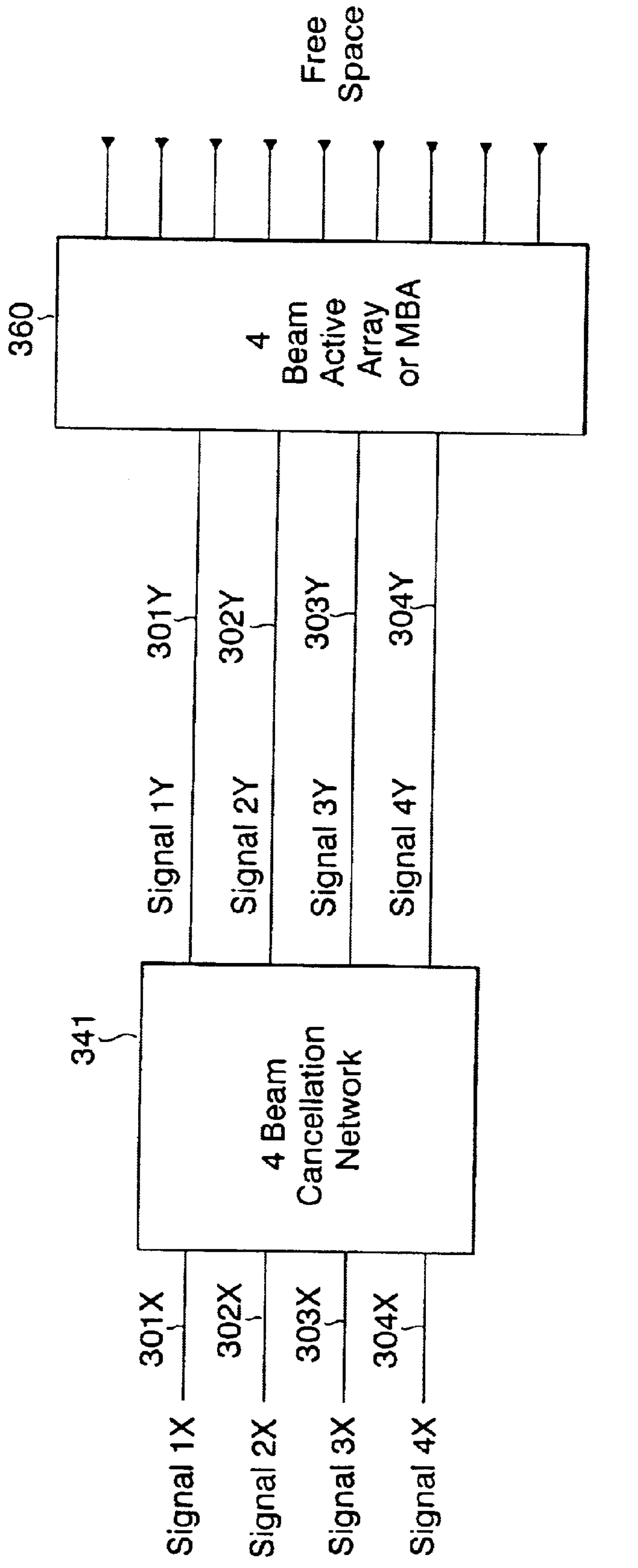
FIG. 3B illustrates a schematic block diagram of an embodiment of the present invention for a 4-beam antenna system in either a transmit mode or a receive mode.

In FIG. 3B, an exemplary embodiment of the present invention is shown as an antenna system block diagram for a 4-beam antenna system 360. Those skilled in the art will recognize that FIG. 3B is a subset of FIG. 3A. FIG. 3B, assuming a transmit mode, includes the four unmodified signals 301X, 302X, 303X and 304X and the four composite signals 301Y, 302Y, 303Y, and 304Y. The four unmodified signals 301X, 302X, 303X and 304X and the four composite signals 301Y, 302Y, 303Y, and 304Y can be at any combination of frequencies. All four unmodified and composite signals can be at the same frequency or they can all be at different frequencies or some of the signals can be at the same frequency and others can be at other frequencies. In this case both co-frequency and adjacent channel (frequency) interference minimization can be achieved. This embodiment is appropriate for applications where there are four signals operating at up to 4 different frequencies. Those skilled in the art will recognize that the previous description for the cancellation network 341 for FIG. 3A in the receive mode can be applied to the cancellation network 341 of FIG. 3B in the receive mode. However, as for FIG. 3B in the transmit mode, the four unmodified signals can be at the same frequency or they can all be at different frequencies or some of the signals can be at the same frequency and others can be at other frequencies. In this case both co-frequency and adjacent channel (frequency) interference minimization can be achieved.

Figure 4A:
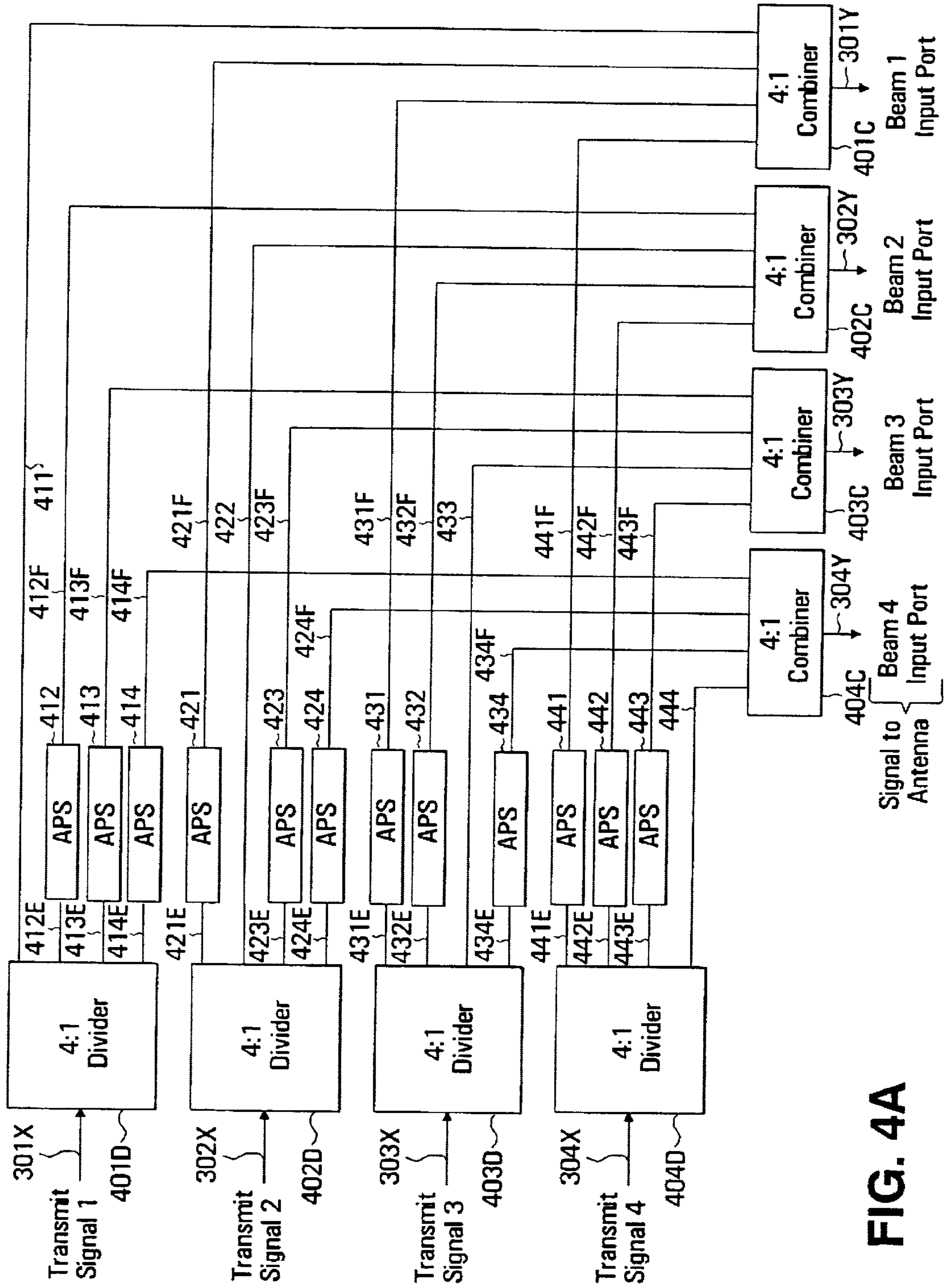
FIG. 4A illustrates a schematic block diagram of a 4-beam cancellation network, as illustrated in FIG. 3A and FIG. 3B, in a transmit mode.

In FIG. 4A, as an example of the embodiment of the invention, cancellation network 341 of both FIG. 3A and FIG. 3B is illustrated for the transmit mode. The discussion of FIG. 4A in the transmit mode below applies to situations where the four input signals into the cancellation network 341 are all at the same frequency as is the case in FIG. 3A. This discussion also applies to situations where the four input signals into the cancellation network 341 are at any combination of frequencies as is the case in FIG. 3B.

Specifically, in the transmit mode, unmodified transmit signal 301X is connected to 4-to-1 divider 401D, resulting in reference fractional signal 411 and non-reference fractional signals 412E, 413E, and 414E. Reference fractional signal 411 travels directly to 4-to-1 companion combiner 401C. Non-reference fractional signals 412E, 413E, and 414E preferably are each connected to attenuator/phase shifters 412, 413, and 414, respectively, and emerge from attenuator/phase shifters 412,413, and 414 as modulated non-reference fractional signals 412F, 413F, and 414F, respectively. However, modulated non-reference fractional signal 412F is connected to 4-to-1 associated combiner 402C, modulated non-reference fractional signal 413F is connected to 4-to-1 associated combiner 403C, and modulated non-reference fractional signal 414F is connected to 4-to-1 associated combiner 404C. Modulated non-reference fractional signals 421F, 431F, and 441F from associated dividers 402D, 403D and 404D, respectively, are combined with reference fractional signal 411 in companion combiner 401C to form the composite transmit signal 301Y which is connected to an input port of the multi-beam transmit antenna 350 from which it is radiated as a transmit beam. Modulated non-reference fractional signals 421F, 431F, and 441F each emerge from their respective attenuator/phase shifter with the necessary amplitude/phase so that when a remote user located within the transmit beam receives this composite signal and also receives the composite signals in the sidelobes of the transmit beams associated with composite signals 302Y, 303Y and 304Y, the components of signals 302X, 303X and 304X substantially cancel leaving only the desired signal 301X. The cancellation is achieved by making the component of signal 302X reaching the remote user through the transmit beam associated with composite signal 301Y substantially equal in amplitude and opposite in phase (sign) to the sum of the components of signal 302X reaching the remote user through the sidelobes of the transmit beams associated with composite signals 302Y, 303Y and 304Y. In the transmit mode, cancellation actually occurs at the remote receivers, e.g., User 1B 116B and User 2B 126B. For this reason, the remote receivers can be located closer together, either on the ground or in space. Therefore, especially the regional traffic capacity of the antenna system can be increased.

Similarly, unmodified transmit signal 302X is connected to 4-to-1 divider 402D, resulting in fractional signals 421E, 422, 423E, and 424E. Reference fractional signal 422 is connected to 4-to-1 companion combiner 402C. Non-reference fractional signals 421E, 423E, and 424E preferably are each connected to attenuator/phase shifters 421, 423, and 424, respectively, and emerge from attenuator/phase shifters 421, 423, and 424 as modulated non-reference fractional signals 421F, 423F, and 424F, respectively. However, modulated non-reference fractional signal 421F is connected to 4-to-1 associated combiner 401C, modulated non-reference fractional signal 423F is connected to 4-to-1 associated combiner 403C, and modulated non-reference fractional signal 424F is connected to 4-to-1 associated combiner 404C. Modulated non-reference fractional signals 412F, 432F, and 442F from associated dividers 401D, 403D and 404D, respectively, are combined with reference fractional signal 422 in companion combiner 402C to form the composite transmit signal 302Y which is connected to an input port of the multi-beam transmit antenna 350 from which it is radiated as a transmit beam.

Unmodified transmit signal 303X is connected to 4-to-1 divider 403D, resulting in fractional signals 431E, 432E, 433 and 434E. Reference fractional signal 433 is connected to 4-to-1 companion combiner 403C. Non-reference fractional signals 431E, 432E, and 434E preferably are each connected to attenuator/phase shifters 431, 432, and 434, respectively, and each emerge from attenuator/phase shifters 431, 432, and 434 as modulated non-reference fractional signals 431F, 432F, and 434F, respectively. However, modulated non-reference fractional signal 431F is connected to 4-to-1 associated combiner 401C, modulated non-reference fractional signal 432F is connected to 4-to-1 associated combiner 402C, and modulated non-reference fractional signal 434F is connected to 4-to-1 associated combiner 404C. Modulated non-reference fractional signals 413F, 423F, and 443F from associated dividers 401D, 402D, and 404D, respectively, are combined with reference fractional signal 433 in companion combiner 403C to form the composite transmit signal 303Y which is connected to an input port of the multi-beam transmit antenna 350 from which it is radiated as a transmit beam.

Finally, unmodified transmit signal 304X is connected 4-to-1 divider 404D, resulting in fractional signals 441E, 442E, 443E, and 444. Reference fractional signal 444 is connected to 4-to-1 companion combiner 404C. Non-reference fractional signals 441E, 442E, and 443E preferably are each connected to attenuator/phase shifters 441, 442, and 443, respectively, and emerge from attenuator/phase shifters 441, 442, and 443 as modulated non-reference fractional signals 441F, 442F, and 443F, respectively. However, modulated non-reference fractional signal 441F is connected to 4-to-1 associated combiner 401C, modulated non-reference fractional signal 442F is connected to 4-to-1 associated combiner 402C, and modulated non-reference fractional signal 443F is connected to 4-to-1 associated combiner 403C. Modulated non-reference fractional signals 414F, 424F, and 434F from associated dividers 401D, 402D and 403D, respectively, are combined with reference fractional signal 444 in companion combiner 404C to form the composite transmit signal 304Y which is connected to an input port of the multi-beam transmit antenna 350 from which it is radiated as a transmit beam.

Figure 4B:
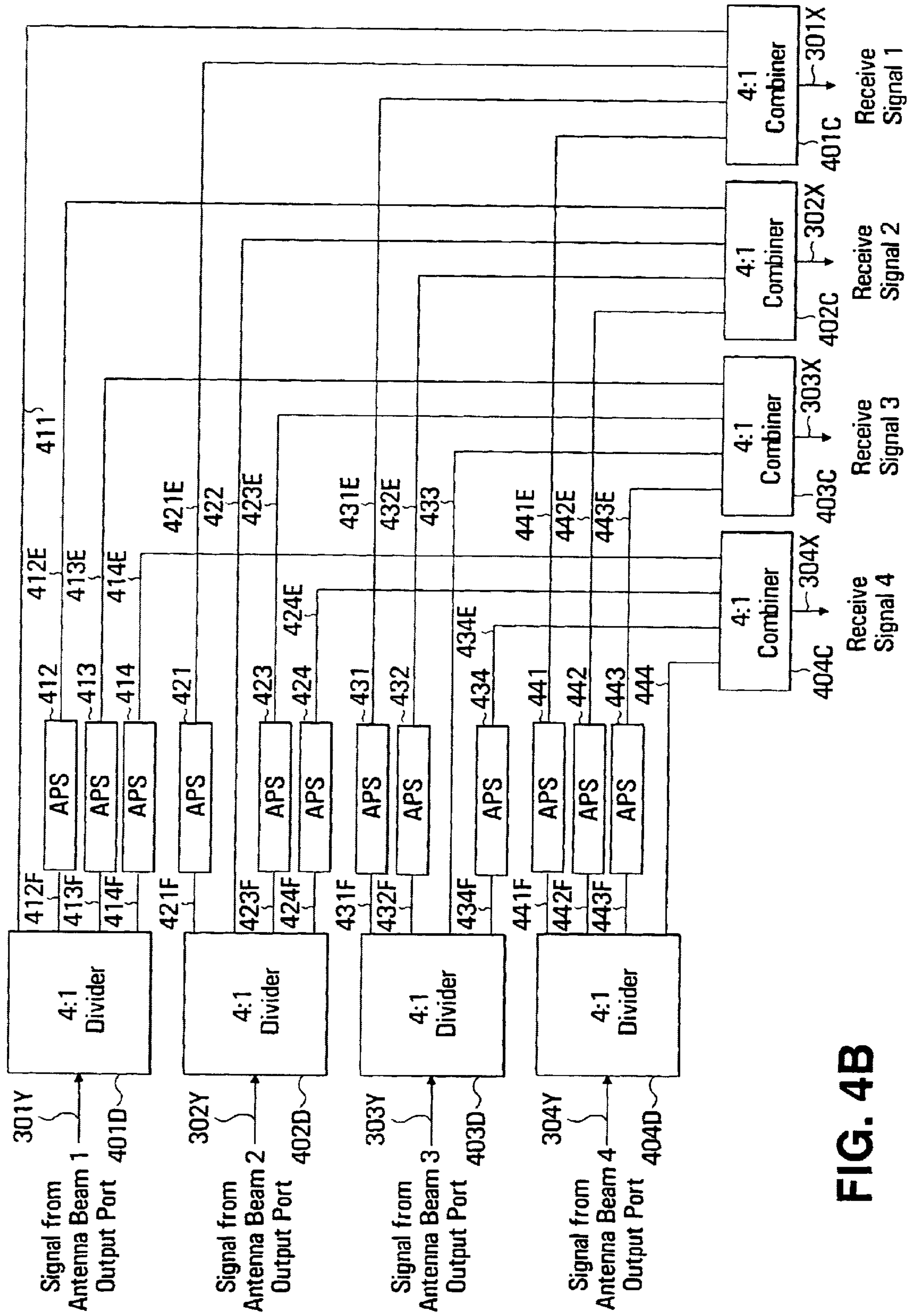
FIG. 4B illustrates a schematic block diagram of a 4-beam cancellation network, as illustrated in FIG. 3A and FIG. 3B, in a receive mode.

The operation of the cancellation network shown in FIG. 4B in the receive mode is very similar to the transmit mode. If the 4:1 dividers 401D, 402D, 403D & 404D shown in FIG. 4A for the transmit mode are of the reciprocal type, they can act as 4:1 combiners. Similarly, if the 4:1 combiners 401C, 402C, 403C & 404C shown in FIG. 4A are of the reciprocal type, they can act as 4:1 dividers. Therefore, the cancellation network established for the transmit mode can reciprocally act in the receive mode. In the receive mode, referring to FIG. 4B, unmodified receive signal 301Y from antenna 350/360 beam 1 output port is divided by 4-to-1 divider 401D resulting in reference fractional signal 411 and non-reference fractional signals 412F, 413F, and 414F. Reference fractional signal 411 travels directly to 4-to-1 companion combiner 401C. Non-reference fractional signals 412F, 413F, and 414F preferably are each connected to attenuator/phase shifters 412, 413, and 414, respectively, and emerge from attenuator/phase shifters 412, 413, and 414 as modulated non-reference fractional signals 412E, 413E, and 414E, respectively. However, modulated non-reference fractional signal 412E is connected to 4-to-1 associated combiner 402C, modulated non-reference fractional signal 413E is connected to 4-to-1 associated combiner 403C, and modulated non-reference fractional signal 414E is connected to 4-to-1 associated combiner 404C. Modulated non-reference fractional signals 421E, 431E, and 441E from associated dividers 402D, 403D and 404D, respectively, are combined with reference fractional signal 411 in companion combiner 401C to form the composite receive signal 301X.

Similarly, unmodified receive signal 302Y from antenna 350/360 beam 2 output port is connected to 4-to-1 divider 402D, resulting in fractional signals 421F, 422, 423F, and 424F. Reference fractional signal 422 is connected to 4-to-1 companion combiner 402C. Non-reference fractional signals 421F, 423F, and 424F preferably are each connected to attenuator/phase shifters 421, 423, and 424, respectively, and emerge from attenuator/phase shifters 421, 423, and 424 as modulated non-reference fractional signals 421E, 423E, and 424E, respectively. However, modulated non-reference fractional signal 421E is connected to 4-to-1 associated combiner 401C, modulated non-reference fractional signal 423E is connected to 4-to-1 associated combiner 403C, and modulated non-reference fractional signal 424E is connected to 4-to-1 associated combiner 404C. Modulated non-reference fractional signals 412E, 432E, and 442E from associated dividers 401D, 403D and 404D, respectively, are combined with reference fractional signal 422 in companion combiner 402C to form the composite receive signal 302X.

Unmodified receive signal 303Y from antenna 350/360 beam 3 output port is connected to 4-to-1 divider 403D, resulting in fractional signals 431F, 432F, 433 and 434F. Reference fractional signal 433 is connected to 4-to-1 companion combiner 403C. Non-reference fractional signals 431F, 432F, and 434F preferably are each connected to attenuator/phase shifters 431, 432, and 434, respectively, and each emerge from attenuator/phase shifters 431, 432, and 434 as modulated non-reference fractional signals 431E, 432E, and 434E, respectively. However, modulated non-reference fractional signal 431E is connected to 4-to-1 associated combiner 401C, modulated non-reference fractional signal 432E is connected to 4-to-1 associated combiner 402C, and modulated non-reference fractional signal 434E is connected to 4-to-1 associated combiner 404C. Modulated non-reference fractional signals 413E, 423E, and 443E from associated dividers 401D, 402D and 404D, respectively, are combined with reference fractional signal 433 in companion combiner 403C to form the composite receive signal 303X.

Finally, unmodified receive signal 304Y from antenna 350/360 beam 4 output port is connected 4-to-1 divider 404D, resulting in fractional signals 441F, 442F, 443F, and 444. Reference fractional signal 444 is connected to 4-to-1 companion combiner 404C. Non-reference fractional signals 441F, 442F, and 443F preferably are each connected to attenuator/phase shifters 441, 442, and 443, respectively, and emerge from attenuator/phase shifters 441, 442, and 443 as modulated non-reference fractional signals 441E, 442E, and 443E, respectively. However, modulated non-reference fractional signal 441E is connected to 4-to-1 associated combiner 401C, modulated non-reference fractional signal 442E is connected to 4-to-1 associated combiner 402C, and modulated non-reference fractional signal 443E is connected to 4-to-1 associated combiner 403C. Modulated non-reference fractional signals 414E, 424E, and 434E from associated dividers 401D, 402D and 403D, respectively, are combined with reference fractional signal 444 in companion combiner 404C to form the composite receive signal 304X. For the receive mode the settings of the attenuator/phase shifters within cancellation network 341 are selected to maximize the signal to interference power ratio of composite signals 301X, 302X, 303X and 304X. These signals are outputs from the multi-beam receive antenna system. The cancellation of the interference power for the receive mode takes place in the 4:1 combiners 401C, 402C, 403C and 404C.

Those skilled in the art will recognize that the only difference between the transmit mode illustrated in FIG. 4A and the receive mode illustrated in FIG. 4B is that the unmodified transmit signal 1 301X is now the unmodified receive signal 301Y connected from antenna 350/360 beam 1 output port. Similarly, composite transmit signal 301Y connected to antenna 350/360 beam 1 input port is now composite receive signal 1 301X.

Those skilled in the art will recognize that, for both the transmit mode and the receive mode, conventional control circuitry and signal processing components (not shown) are applied to control the attenuation and phase shifting process with respect to the reference fractional signals. Those skilled in the art will further recognize that the attenuating means and phase shifting means and the process steps of matching the amplitude and countering the phase of the interfering signal are subject to accuracy requirements only as rigorous as those required for an end user to interpret the received signal. Also, for design and/or manufacturing convenience, attenuating means and phase shifting means can be connected also in the wires transporting the reference fractional signal.

Those skilled in the art will recognize that in FIG. 4A and FIG. 4B, a pattern exists such that each divider has a companion combiner and three associated combiners. Conversely, each combiner has a companion divider and three associated dividers. Each unmodified transmit signal for transmit or unmodified receive signal from a receive antenna output port enters a divider and emerges from the divider as a plurality of fractional signals with one fractional signal becoming a reference fractional signal and at least one fractional signal becoming a non-reference fractional signal. Each reference fractional signal is directly connected from its source divider to a companion combiner. The non-reference fractional signals are typically modulated by an amplitude attenuator and a phase shifter and are connected from their source divider to an associated combiner. Each companion combiner is connected by its incoming modulated non-reference fractional signal paths to associated dividers and is connected by the incoming reference fractional signal path to its companion combiner. There are M−1=N−1 attenuators/phase shifters associated with each divider and combiner (where M,N are the number of signal input or output ports that are part of the cancellation network). Each of cancellation networks 342, 343, and 344 is arranged analogously to cancellation network 341.

Figure 5A:
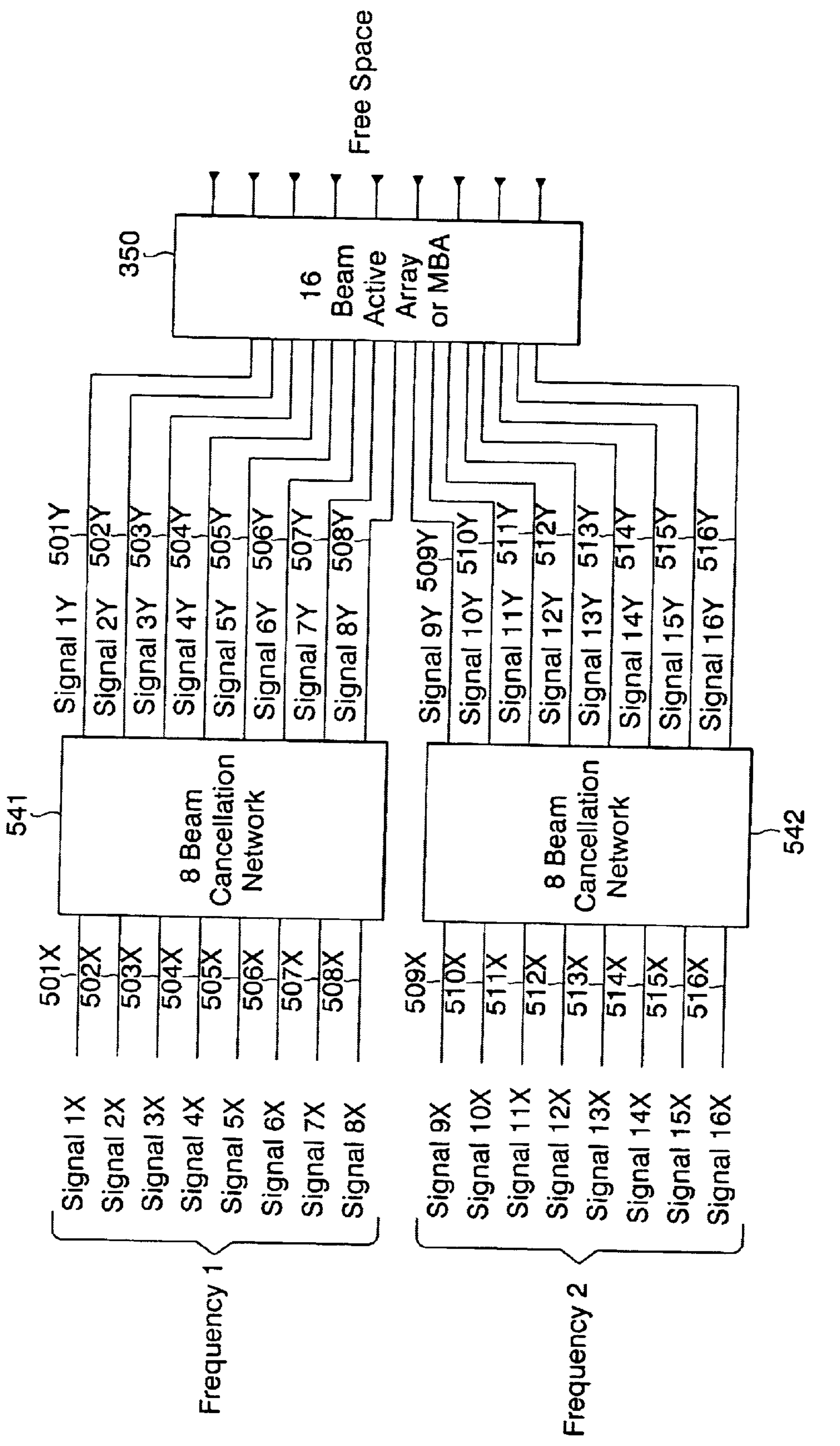
FIG. 5A illustrates a schematic block diagram of a variation of the embodiment of the present invention for a 16-beam antenna system in either a transmit mode or a receive mode.

The present invention can be extended to applications with varying numbers of beams and frequencies. Referring to FIG. 5A, an exemplary embodiment of the present invention is shown as an antenna system block diagram for a 16 beam antenna system. In the description of this example, it is assumed that it is desired to operate this antenna system with two groups of eight beams. This embodiment is appropriate for applications where there are eight signals at each of two operating frequencies. All eight beams within each beam group operate at the same frequency. The two beam groups operate at different frequencies. In this exemplary application, it is assumed that it is desired to minimize co-frequency interference. This implementation minimizes co-frequency interference at each of the two operating frequencies. If either of the signal groups contains signals operating at more than one frequency both co-frequency and adjacent channel interference may also be minimized. This is similar to the mode of operation described in the discussion of FIG. 3B above.

Referring to FIG. 5A, and assuming a transmit mode of operation, unmodified transmit signals 501X to 508X each operate at a pre-determined frequency 1, and each of signals 501X to 508X are connected to a dedicated 8-beam cancellation network 541. Upon emerging from the cancellation network 541, each signal, now designated as composite signals 501Y to 508Y , respectively, enters the respective input port of 16-beam antenna 350 of FIG. 5A.

Similarly, unmodified transmit signals 509X to 516X each operate at a pre-determined frequency 2, and each of unmodified transmit signals 509X to 516X are connected to a dedicated 8-beam cancellation network 542. Upon emerging from the cancellation network 542, each signal, now designated as composite signals 509Y to 516Y respectively, enters the respective input port of 16-beam antenna 350 of FIG. 5A.

Those skilled in the art will recognize that the receive mode for the antenna 350 of 16-beam antenna system of FIG. 5A is identical to the transmit mode except that the composite transmit signals 501Y through 516Y connected to the antenna beam input ports now become the unmodified receive signals 501Y through 516Y connected from the antenna beam output ports. Similarly, unmodified transmit signals 501X through 516X now become composite receive signals 501X through 516X.

Figure 5B:
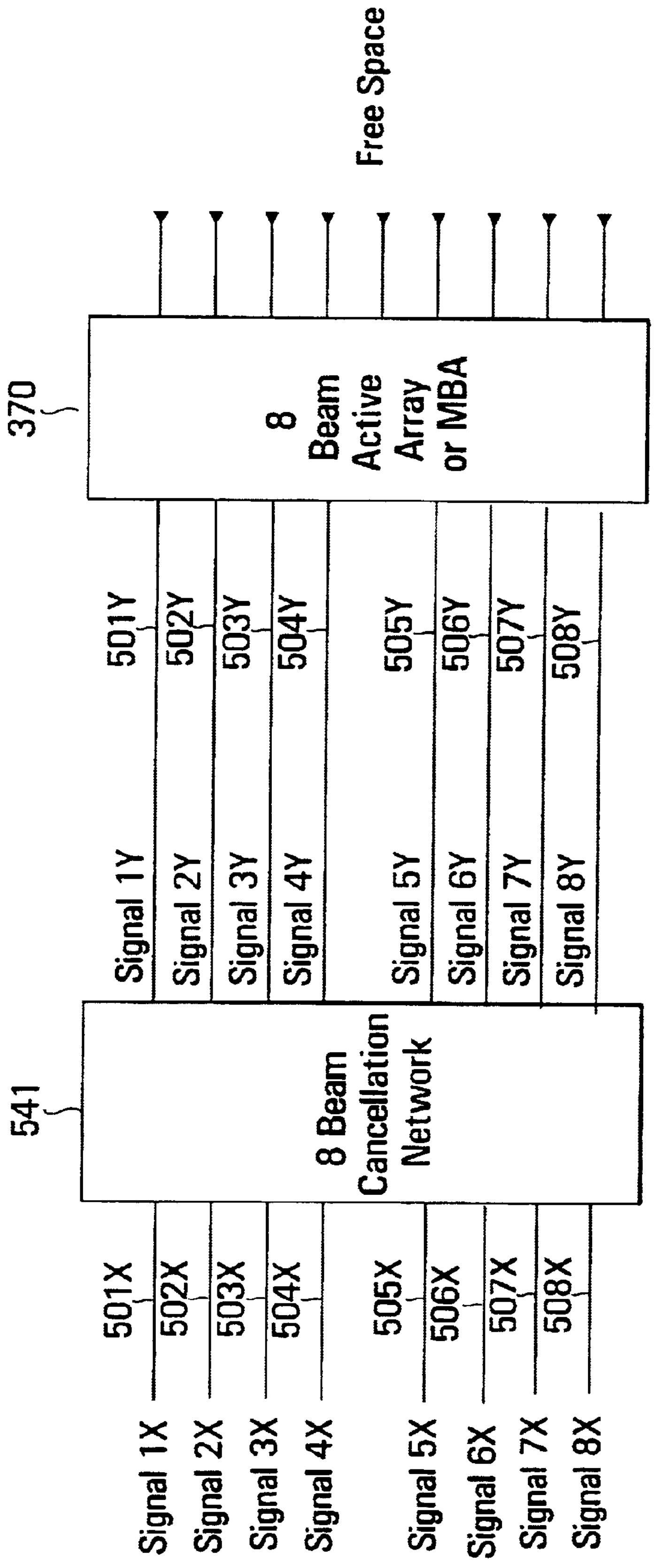
FIG. 5B illustrates a schematic block diagram of a variation of the embodiment of the present invention for an 8-beam adjacent channel antenna system in either a transmit mode or a receive mode.

In FIG. 5B, an embodiment of the present invention is shown as an antenna system block diagram incorporating 8-beam antenna 370. Those skilled in the art will recognize that FIG. 5B is a subset of FIG. 5A. FIG. 5B, again assuming a transmit mode of operation, includes the eight unmodified transmit signals 501X to 508X and the eight composite signals 501Y to 508Y. The eight unmodified transmit signals 501X to 508X and the eight composite signals 501Y to 508Y can be at any combination of frequencies. This embodiment is appropriate for applications where there are eight signals operating at up to eight different frequencies. If more than one frequency is used this implementation can minimize adjacent channel interference. It can also be used to minimize co-frequency interference if two or more signals use the same operating frequency. In this case both co-frequency and adjacent channel (frequency) interference minimization can be achieved. Again, those skilled in the art will recognize that the receive mode for the 8-beam antenna system of FIG. 5B is identical to the transmit mode except that the composite transmit signals connected to the antenna beam input ports 501Y through 508Y now become the unmodified receive signals 501Y through 508Y connected from the antenna beam output ports. Similarly, unmodified transmit signals 501X through 508X now become composite receive signals 501X through 508X.

Figure 6A:
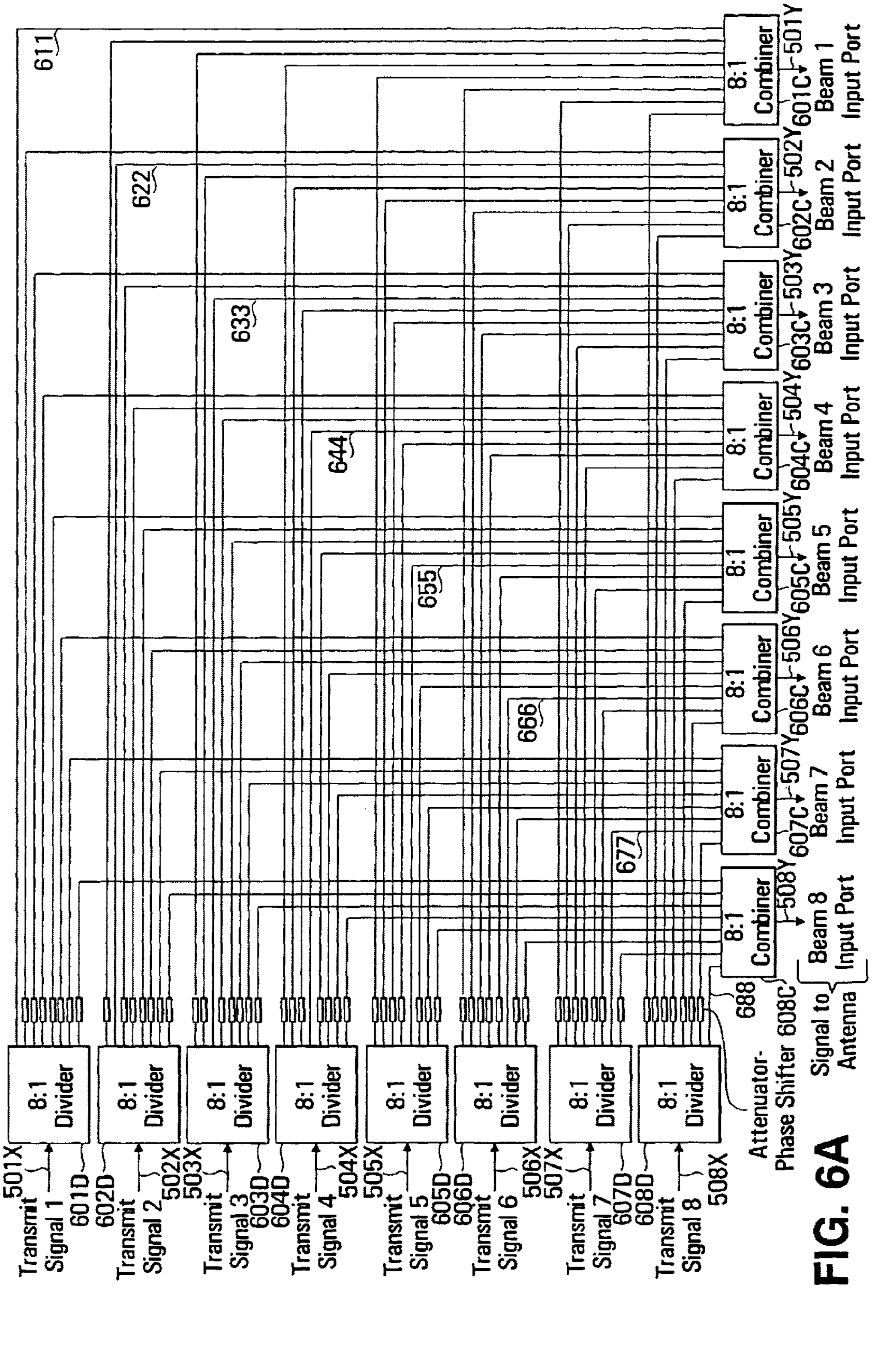
FIG. 6A illustrates a schematic block diagram of an 8-beam cancellation network, as illustrated in FIG. 5A and FIG. 5B, in a transmit mode.

In FIG. 6A, as an example of the embodiment of the invention, cancellation network 541 of both FIG. 5A and FIG. 5B is illustrated in the transmit mode of operation.

Specifically, unmodified transmit signal 501X is connected to 8-to-1 divider 601D, resulting in the formation of eight fractional signals. The first fractional signal, reference fractional signal 611 is connected directly to 8-to-1 companion combiner 601C. Unmodified transmit signal 502X is connected to divider 602D, whence reference fractional signal 622 emerges connected directly to 8-to-1 companion combiner 602C. Unmodified transmit signal 503X is connected to 8-to-1 divider 603D, whence reference fractional signal 633 emerges connected directly to 8-to-1 companion combiner 603C. Unmodified transmit signal 504X is connected to 8-to-1 divider 604D, whence reference fractional signal 644 emerges connected directly to 8-to-1 companion combiner 604C. Unmodified transmit signal 505X is connected to 8-to-1 divider 605D, whence reference fractional signal 655 emerges connected directly to 8-to-1 companion combiner 605C. Unmodified transmit signal 506X is connected to 8-to-1 divider 606D, whence reference fractional signal 666 emerges connected directly to 8-to-1 companion combiner 606C. Unmodified transmit signal 507X is connected to 8-to-1 divider 607D, whence reference fractional signal 677 emerges connected directly to 8-to-1 companion combiner 607C. Finally, unmodified transmit signal 508X is connected to 8-to-1 divider 608D, whence reference fractional signal 688 emerges connected directly to 8-to-1 companion combiner 608C.

Composite transmit signals 501Y to 508Y emerge from combiners 601C through 608C, respectively. These composite signals are connected to their respective input ports to multi-beam transmit antenna 350/370.

Figure 6B:
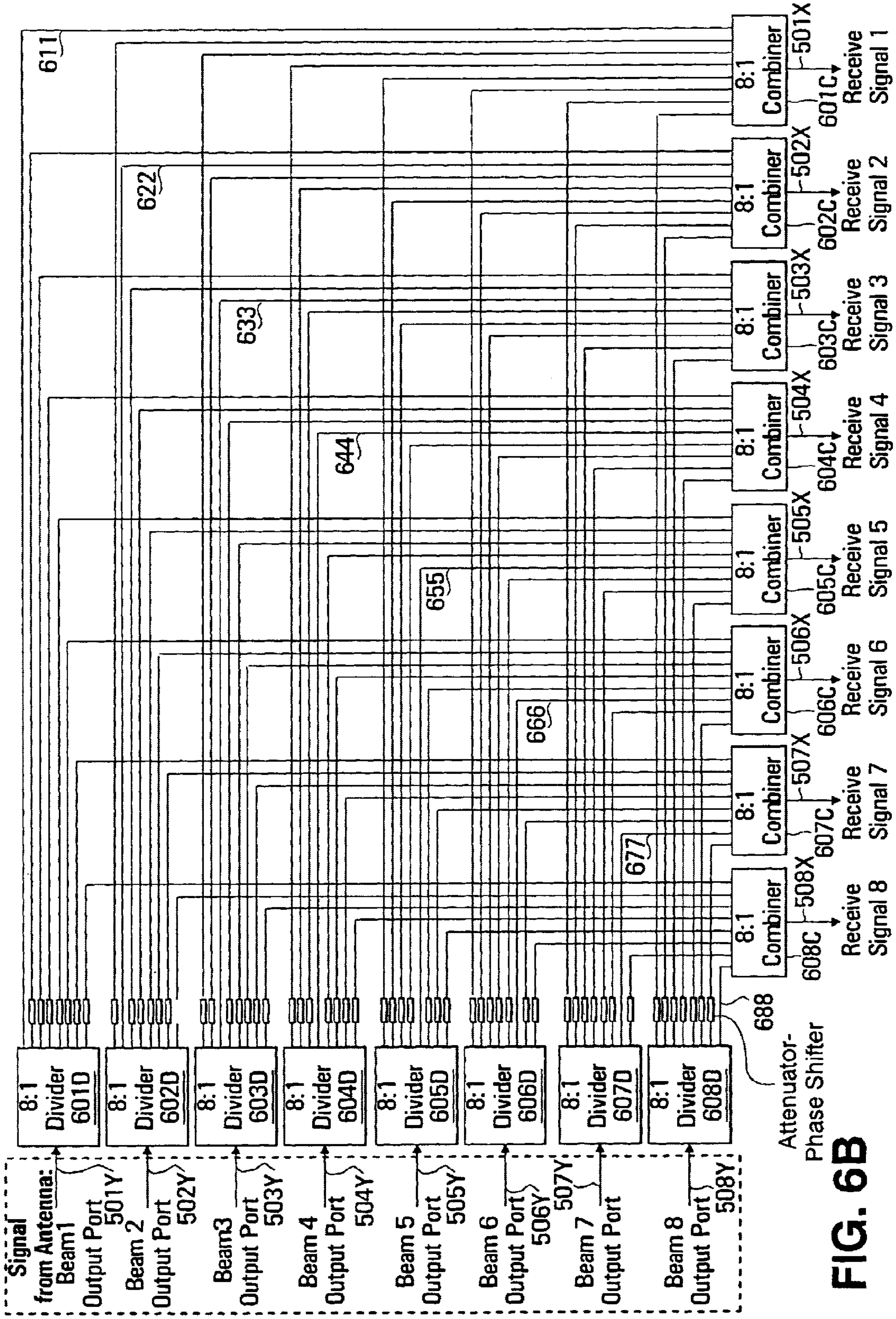
FIG. 6B illustrates a schematic block diagram of an 8-beam cancellation network, as illustrated in FIG. 5A and FIG. 5B, in a receive mode.

In FIG. 6B, as an example of the embodiment of the invention, cancellation network 541 of both FIG. 5A and FIG. 5B is illustrated in the receive mode of operation. Specifically, unmodified receive signal 501Y from antenna 350/370 beam 1 output port is connected to 8-to-1 divider 601D, resulting in the formation of eight fractional signals. The first fractional signal, reference fractional signal 611 is connected directly to 8-to-1 companion combiner 601C. Unmodified receive signal 502Y from antenna 350/370 beam 2 output port is connected to divider 602D, whence reference fractional signal 622 emerges connected directly to 8-to-1 companion combiner 602C. Unmodified receive signal 503Y from antenna 350/370 beam 3 output port is connected to 8-to-1 divider 603D, whence reference fractional signal 633 emerges connected directly to 8-to-1 companion combiner 603C. Unmodified receive signal 504Y from antenna 350/370 beam 4 output port is connected to 8-to-1 divider 604D, whence reference fractional signal 644 emerges connected directly to 8-to-1 companion combiner 604C. Unmodified receive signal 505Y from antenna 350/370 beam 5 output port is connected to 8-to-1 divider 605D, whence reference fractional signal 655 emerges connected directly to 8-to-1 companion combiner 605C. Unmodified receive signal 506Y from antenna 350/370 beam 6 output port is connected to 8-to-1 divider 606D, whence reference fractional signal 666 emerges connected directly to 8-to-1 companion combiner 606C. Unmodified receive signal 507Y from antenna 350/370 beam 7 output port is connected to 8-to-1 divider 607D, whence reference fractional signal 677 emerges connected directly to 8-to-1 companion combiner 607C. Finally, unmodified receive signal 508Y from antenna 350/370 beam 8 output port is connected to 8-to-1 divider 608D, whence reference fractional signal 688 emerges connected directly to 8-to-1 companion combiner 608C.

Composite receive signals 501X to 508X emerge from combiners 601C through 608C, respectively.

Figure 7:
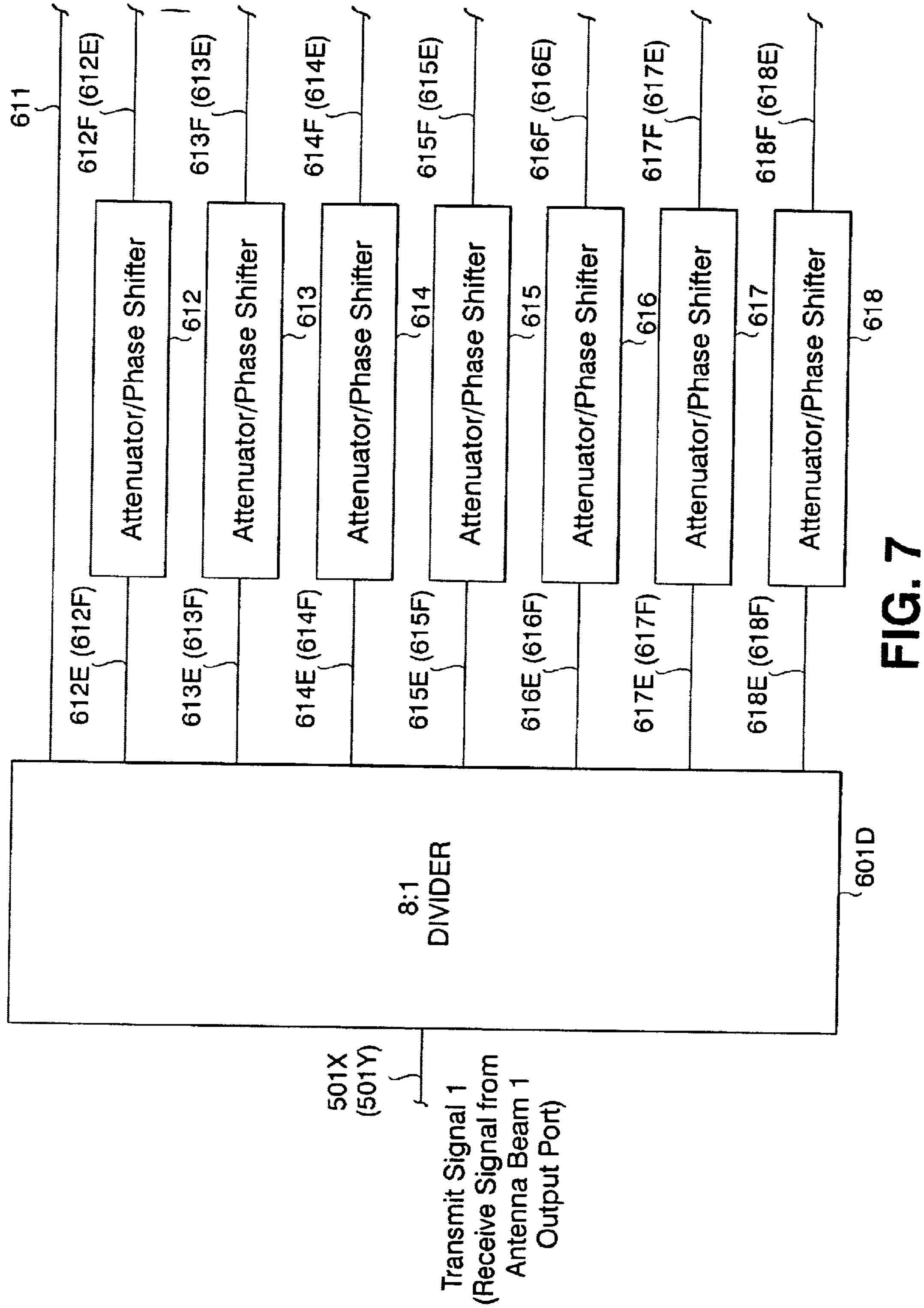
FIG. 7 illustrates an expanded schematic block diagram of one of the 8:1 dividers, and associated circuitry, that is illustrated in FIG. 6A and FIG. 6B.

In FIG. 7, an expanded view of the 8:1 divider 601D and associated circuitry illustrated in FIG. 6A and FIG. 6B is shown. Specifically, as noted previously for FIG. 6A, in the transmit mode, signal 501X is connected to 8-to-1 divider 601D resulting in the formation of fractional signals 611, 612E, 613E, 614E, 615E, 616E, 617E and 618E. Reference fractional signal 611 is connected directly to the 8-to-1 companion combiner 601C shown in FIG. 6A.

Further, non-reference fractional signal 612E is connected to attenuator/phase shifter 612, whence it emerges as modulated non-reference fractional signal 612F, and is connected to the 8-to-1 associated combiner 602C shown in FIG. 6A.

Non-reference fractional signal 613E is connected to attenuator/phase shifter 613, whence it emerges as modulated non-reference fractional signal 613F, and is connected to the 8-to-1 associated combiner 603C shown in FIG. 6A.

Non-reference fractional signal 614E is connected to attenuator/phase shifter 614, whence it emerges as modulated non-reference fractional signal 614F, and is connected to the 8-to-1 associated combiner 604C shown in FIG. 6A.

Non-reference fractional signal 615E is connected to attenuator/phase shifter 615, whence it emerges as modulated non-reference fractional signal 615F, and is connected to the 8-to-1 associated combiner 605C shown in FIG. 6A.

Non-reference fractional signal 616E is connected to attenuator/phase shifter 616, whence it emerges as modulated non-reference fractional signal 616F, and is connected to the 8-to-1 associated combiner 606C shown in FIG. 6A.

Non-reference fractional signal 617E is connected to attenuator/phase shifter 617, whence it emerges as fractional signal 617F, and is connected to the 8-to-1 associated combiner 607C shown in FIG. 6A.

Finally, non-reference fractional signal 618E is connected to attenuator/phase shifter 618, whence it emerges as fractional signal 618F, and is connected to the 8-to-1 associated combiner 608C shown in FIG. 6A.

Modulated non-reference fractional signals 621F, 631F, 641F, 651F, 661F, 671F and 681F (identification numbers not shown on FIG. 6A) are combined with reference fractional signal 611 in combiner 601C to form the composite transmit signal 501Y which is connected to an input port of the multi-beam transmit antenna and is radiated as a transmit beam associated with composite transmit signal 501Y. Modulated non-reference fractional signals 621F, 631F, 641F, 651F, 661F, 671F and 681F each emerge from their respective attenuator/phase shifter with the necessary amplitude/phase so that when a remote user located within the transmit beam associated with composite signal 501Y receives this composite signal and also receives the composite signals in the sidelobes of the seven beams associated with composite signals 502Y, 503Y, 504Y, 505Y, 506Y, 507Y and 508Y, the components of signals 502X, 503X, 504X, 505X, 506X, 507X and 508X substantially cancel leaving only the desired signal 501X. The cancellation is achieved by making the component of signal 502X reaching the remote user through the transmit beam associated with composite signal 501Y substantially equal in amplitude and opposite in phase (sign) to the sum of the components of signal 502X reaching the remote user through the sidelobes of the transmit beams associated with composite signals 502Y, 503Y, 504Y, 505Y, 506Y, 507Y and 508Y. The cancellation actually occurs at the remote receivers, e.g., User 1A 116A and User 2A 126A. For this reason, the remote receivers can be located closer together, either on the ground or in space. Therefore, especially the regional traffic capacity of the antenna system can be increased.

Those skilled in the art will recognize that the internal network configuration for the remainder of cancellation network 541 for each of the remaining seven (7) signals 502X, 503X, 504X, 505X, 506X, 507X, and 508X is analogous to the foregoing description for signal 501X. Furthermore, those skilled in the art will recognize that the internal network configuration for cancellation network 542 for signals 509X, 510X, 511X, 512X, 513X, 514X, 515X and 516X is analogous to the foregoing description for cancellation network 541.

Those skilled in the art will recognize that FIG. 7 applies also to the receive mode. In the receive mode, transmit signal 1501X becomes instead receive signal from antenna beam 1 output port 501Y which is connected to 8-to-1 divider 601D, resulting instead in the formation of fractional signals 611, 612F, 613F, 614F, 615F, 616F, 617F and 618F. Again, reference fractional signal 611 is connected directly to the 8-to-1 companion combiner 601C shown in FIG. 6B.

Now, non-reference fractional signal 612F is connected to attenuator/phase shifter 612, whence it emerges as modulated non-reference fractional signal 612E, and is connected to the 8-to-1 associated combiner 602C shown in FIG. 6B.

Non-reference fractional signal 613F is connected to attenuator/phase shifter 613, whence it emerges as modulated non-reference fractional signal 613E, and is connected to the 8-to-1 associated combiner 603C shown in FIG. 6B.

Non-reference fractional signal 614F is connected to attenuator/phase shifter 614, whence it emerges as modulated non-reference fractional signal 614E, and is connected to the 8-to-1 associated combiner 604C shown in FIG. 6B.

Non-reference fractional signal 615F is connected to attenuator/phase shifter 615, whence it emerges as modulated non-reference fractional signal 615E, and is connected to the 8-to-1 associated combiner 605C shown in FIG. 6B.

Non-reference fractional signal 616F is connected to attenuator/phase shifter 616, whence it emerges as modulated non-reference fractional signal 616E, and is connected to the 8-to-1 associated combiner 606C shown in FIG. 6B.

Non-reference fractional signal 617F is connected to attenuator/phase shifter 617, whence it emerges as fractional signal 617E, and is connected to the 8-to-1 associated combiner 607C shown in FIG. 6B.

Finally, non-reference fractional signal 618F is connected to attenuator/phase shifter 618, whence it emerges as fractional signal 618E, and is connected to the 8-to-1 associated combiner 608C shown in FIG. 6B.

For the receive mode, modulated non-reference fractional signals 621E, 631E, 641E, 651E, 661E, 671E and 681E (identification numbers not shown on FIG. 6B) are combined with reference fractional signal 611 in combiner 601C to form the composite receive signal 501X. For the receive mode, the settings of the attenuator/phase shifters within cancellation network 541 are selected to maximize the signal to interference power ratio of composite receive signals 501X to 508X. These signals are outputs from the multi-beam receive antenna system. The cancellation of the interference power for the receive mode takes place in the 8-to-1 combiners 601C to 608C.

Again as for the transmit mode, for this reason, the remote transmitters in the receive mode can be located closer together, either on the ground or in space. Therefore, especially the regional traffic capacity of the antenna system can be increased.

Those skilled in the art again will recognize that the internal network configuration for the remainder of cancellation network 541 for each of the remaining seven (7) signals 502Y, 503Y, 504Y, 505Y, 506Y, 507Y, and 508Y is analogous to the foregoing description for signal 501Y. As noted previously, a phase shifter and/or attenuator may be included in the paths associated with reference fractional signals 611, 622, 633, 644, 655, 666, 677, and 688 for design and/or manufacturing convenience. Furthermore, those skilled in the art again will recognize that the internal network configuration for cancellation network 542 is analogous to the foregoing description for cancellation network 541.

Those skilled in the art will recognize again that a pattern exists for the networks illustrated in FIG. 6A and FIG. 6B for both the transmit mode and the receive mode that is identical to the pattern in FIG. 4A and FIG. 4B such that each divider has a companion combiner and seven associated combiners. Conversely, each combiner has a companion divider and seven associated dividers. Each unmodified transmit signal for transmit or unmodified receive signal from a receive antenna output port enters a divider and emerges from the divider as a plurality of fractional signals with one fractional signal becoming a reference fractional signal and at least one fractional signal becoming a non-reference fractional signal. Each reference fractional signal is directly connected from its source divider to a companion combiner. The non-reference fractional signals are typically modulated by an amplitude attenuator and a phase shifter and are connected from their source divider to an associated combiner. Each companion combiner is connected through attenuator/phase shifter circuits to associated dividers and is directly connected to its companion combiner. There are M−1=N−1 attenuators/phase shifters associated with each divider and combiner (where M,N are the number of signal input, output ports that are part of the cancellation network). Cancellation network 542 is arranged analogously to cancellation network 541.

Those skilled in the art will recognize that also for the cancellation network and antenna system shown in FIG. 5A, FIG. 5B, FIG. 6A and FIG. 6B, and FIG. 7, conventional control circuitry and signal processing components (not shown) are applied to control the attenuation and phase shifting process with respect to the reference fractional signals. Those skilled in the art will further recognize that the attenuating means and phase shifting means and the process steps of matching the amplitude and countering the phase of the interfering signal are subject to accuracy requirements only as rigorous as those required for an end user to interpret the received signal.

With respect to FIGS. 3A, 3B and FIGS. 5A, 5B, those skilled in the art will recognize also that the plurality of signals at any frequency can be arranged either separately into groups of co-frequency signals as described for FIGS. 3A and 5A, or into groups of signals operating at any frequency as described for FIGS. 3B and 5B. In particular, groups of signals with some signals at the same frequency and some signals at different frequencies can be handled. In this case both co-frequency and adjacent channel (frequency) interference minimization can be achieved.

The invention has now been explained with reference to specific embodiments. Other embodiments will be apparent to those of ordinary skill in the art in view of the foregoing description. It is not intended that this invention be limited except as indicated by the appended claims and their full scope equivalents.

What is claimed is:

1. A system for increasing the beam traffic capacity of a multi-beam antenna system, the multi-beam antenna system capable of being used in a transmit mode, the system having a plurality of signals at any frequency transmitted when the multi-beam antenna is used as a transmit antenna, the system comprising:

said multi-beam antenna, and a separate, dedicated interference cancellation means for canceling interference with at least one signal, the interference being caused by at least one antenna beam sidelobe, the interference cancellation means being connected to the multi-beam antenna, wherein when the multi-beam antenna system is used in a transmit mode, at least one of the plurality of beams transmitted by the multi-beam antenna is pointed towards at least one remote user, said interference cancellation means having an input port for each of the plurality of signals, said interference cancellation means creating a plurality of composite signals, said interference cancellation means having an output port for each of the composite signals, the transmit antenna having an input port connected to each output port of said interference cancellation means such that the composite signals become the input signals to the transmit multi-beam antenna, and the composite signals emerging from said interference cancellation means optimize the signal to interference ratio at the at least one remote user;

said interference cancellation means being a network in the multi-beam antenna system comprising a plurality of power dividers and a plurality of power combiners, each power divider having an input port connected to the transmit signal intended to be transmitted by the transmit multi-beam antenna, each of said power dividers dividing the signal connected to said input port into one reference fractional signal and at least one non-reference fractional signal, therein defining said power divider as a source power divider to said one reference fractional signal and to said at least one non-reference fractional signal, said source power divider having a plurality of output ports, an output port of said source power divider containing said reference fractional signal being connected to an input port of one of said power combiners, therein defining said power combiner as a companion power combiner to said source power divider, each output port of said source power divider containing a non-reference fractional signal being connected to an input port of another one of said power combiners, therein defining said another one of said power combiners as an associated power combiner to said source power divider, each companion power combiner receiving at least one non-reference fractional signal through a path connecting from the source power divider of said at least one non-reference fractional signal, therein defining said source power divider of said at least one non-reference fractional signal as an associated power divider to said companion power combiner, each of said companion power combiners combining said reference fractional signal emerging from said companion source power divider with said at least one non-reference fractional signal from an associated power divider into a composite output signal, wherein an output port of each of said power combiners is connected to an input port of the transmit multi-beam antenna such that said composite signals emerging from said interference cancellation means at said output ports of each of said power combiners become the signals transmitted at any frequency when the multi-beam antenna is used as a transmit antenna.

2. The system of claim 1 wherein the multi-beam antenna is an active phased array antenna.

3. The system of claim 1 wherein the multi-beam antenna is a reflector class antenna with multiple feeds.

4. The system of claim 1 wherein said dividing means comprises a reciprocal combining means.

5. The system of claim 1 wherein said combining means comprises a reciprocal dividing means.

6. The system of claim 1 wherein attenuating means are included for attenuating the amplitude of at least one of said non-reference fractional signals to achieve the desired amplitude relative to at least one of said reference fractional signals.

7. The system of claim 6 wherein said attenuating means is included with one of said (a) combining means, and (b) dividing means.

8. The system of claim 1 wherein phase shifting means are included for shifting the phase of at least one of said plurality of non-reference fractional signals to achieve the desired phase relative to at least one of said reference fractional signals.

9. The system of claim 8 wherein said phase shifting means is included with one of said (a) combining means, and (b) dividing means.

10. The system of claim 1 wherein attenuating means are included for attenuating the amplitude of said reference fractional signal.

11. The system of claim 10 wherein said attenuating means is included with one of said (a) combining means, and (b) dividing means.

12. The system of claim 1 wherein phase shifting means are included for shifting the phase of said reference fractional signal.

13. The system of claim 12 wherein said phase shifting means is included with one of said (a) combining means, and (b) dividing means.

14. A system for increasing the beam traffic capacity of a multi-beam antenna system, the multi-beam antenna system capable of being used in a receive mode, the system having a plurality of signals at any frequency received when the multi-beam antenna is used as a receive antenna, the system comprising:

said multi-beam antenna, and a separate, dedicated interference cancellation means for canceling interference with at least one signal, the interference being caused by at least one antenna beam sidelobe, the interference cancellation means being connected to the multi-beam antenna, wherein when the multi-beam antenna system is used in a receive mode, each beam of the receive antenna collects a signal, referred to as the intended signal, from at least one remote user, the sidelobe of at least one beam collecting at least one signal from at least one other remote user, the signal from the at least one other remote user causing interference to the intended signal in the beam, the receive antenna having for each beam an output port which is connected to an input port of said interference cancellation means such that both the intended signal and the interference emerging from each output port of the receive multi-beam antenna are injected into said interference cancellation means at said input port, said interference cancellation means creating a plurality of composite signals, said interference cancellation means having an output port for each of the composite signals, the composite signals emerging from said output port of said interference cancellation means optimize the signal to interference ratio of at least one intended signal collected from the at least one remote user, said interference cancellation means being a network in said multi-beam antenna system comprising a plurality of power dividers and a plurality of power combiners, each power divider having an input port connected to an output port of the receive multi-beam antenna, such that the signals at any frequency received when the multi-beam antenna is used as a receive antenna become the input signals to said interference cancellation network, each of said power dividers dividing the signal connected to said input port into one reference fractional signal and at least one non-reference fractional signal, therein defining said power divider as a source power divider to said one reference fractional signal and to said at least one non-reference fractional signal, said source power divider having a plurality of output ports, an output port of said source power divider containing the reference fractional signal being connected to an input port of one of said power combiners, therein defining said power combiner as a companion power combiner to said source power divider, each output port of said source power divider containing a non-reference fractional signal being connected to an input port of another one of said power combiners, therein defining said another one of said power combiners as an associated power combiner to said source power divider, each companion power combiner receiving at least one non-reference fractional signal through a path connecting from the source power divider of said at least one non-reference fractional signal, therein defining said source power divider of said at least one non-reference fractional signal as an associated power divider to said companion power combiner, wherein each of said companion power combiners combines said reference fractional signal emerging from said companion source power divider with said at least one non-reference fractional signal from an associated power divider into a composite output signal, said composite output signal emerging from an output port of each power combiner of said interference cancellation network, each said output port of each of said power combiners of said interference cancellation network being an output port of said receive multi-beam antenna system, such that said composite output signal of said interference cancellation network is an output signal of the receive multi-beam antenna system.

15. The system of claim 14 wherein said dividing means comprises a reciprocal combining means.

16. The system of claim 14 wherein said combining means comprises a reciprocal dividing means.

17. The system of claim 14 wherein attenuating means are included for attenuating the amplitude of at least one of said non-reference fractional signals to achieve the desired amplitude relative to at least one of said reference fractional signals.

18. The system of claim 17 wherein said attenuating means is included with one of said (a) combining means, and (b) dividing means.

19. The system of claim 14 wherein phase shifting means are included for shifting the phase of at least one of said plurality of non-reference fractional signals to achieve the desired phase relative to at least one of said reference fractional signals.

20. The system of claim 19 wherein said phase shifting means is included with one of said (a) combining means, and (b) dividing means.

21. The system of claim 14 wherein attenuating means are included for attenuating the amplitude of said reference fractional signal.

22. The system of claim 21 wherein said attenuating means is included with one of said (a) combining means, and (b) dividing means.

23. The system of claim 14 wherein phase shifting means are included for shifting the phase of said reference fractional signal.

24. The system of claim 23 wherein said phase shifting means is included with one of said (a) combining means, and (b) dividing means.

25. The system of claim 14 wherein said system is a system for increasing the beam traffic capacity in a region around any remote user, the size of the region being on the order of 3 to 5 beam widths in any direction from the remote user.

26. The system of claim 14 wherein the multi-beam antenna is an active phased array antenna.

27. The system of claim 14 wherein the multi-beam antenna is a reflector class antenna with multiple feeds.

28. The system of claim 1 wherein said system is a system for increasing the beam traffic capacity in a region around any remote user, the size of the region being on the order of 3 to 5 beam widths in any direction from the remote user.

29. A method for increasing the beam traffic capacity of a multi-beam antenna transmitting a plurality of beams operating at any frequency, at least one of said plurality of beams pointed toward a remote user, at least one other of said plurality of beams having at least one sidelobe directed towards the remote user causing interference at the remote user with the signal contained in the beam pointed toward the remote user, said method performed by means of a separate, dedicated interference cancellation network having as input a plurality of transmit signals each intended to correspond to one of the plurality of beams operating at any frequency, said interference cancellation network comprising a plurality of dividers and a plurality of combiners, each of said plurality of dividers having a companion combiner and at least one associated combiner, each of said plurality of combiners having a companion divider and at least one associated divider, each of said dividers having an input port for one of the plurality of transmit signals, said method comprising the steps of:

(a) applying each of the plurality of transmit signals to the input ports of each of said dividers, (b) dividing in each of said dividers each of the transmit signals into a reference fractional signal and at least one non-reference fractional signal, said reference fractional signal and said non-reference fractional signal therein each having a common source divider, (c) transporting said reference fractional signal to said companion combiner of said common source divider, (d) transporting said at least one non-reference fractional signal to one of said at least one associated combiners of said common source divider, and (e) combining in each of said companion combiners said one reference fractional signal from said companion divider with said at least one non-reference fractional signal from said at least one associated divider into a composite signal, said composite signal thereby optimizing the signal to interference ratio at the remote user.

30. The method of claim 29, following step (b) of dividing in each of said dividers each of said transmit signals into a reference fractional signal and at least one non-reference fractional signal, further comprising the step of attenuating the amplitude of said at least one of said plurality of non-reference fractional signals to achieve the desired amplitude relative to at least one of said reference fractional signals.

31. The method of claim 29, following step (b) of dividing in each of said dividers each of said transmit signals into a reference fractional signal and at least one non-reference fractional signal, further comprising the step of shifting the phase of said at least one of said plurality of non-reference fractional signals to achieve the desired phase relative to the phase of at least one of said reference fractional signals.

32. The method of claim 29 wherein the multi-beam antenna is an active phased array antenna.

33. The method of claim 29 wherein the multi-beam antenna is a reflector class antenna with multiple feeds.

34. The method of claim 29 wherein said method is a method for increasing the beam traffic capacity in a region around any remote user, the size of the region being on the order of 3 to 5 beam widths in any direction from the remote user.

35. A method for increasing the beam traffic capacity of a multi-beam antenna receiving a plurality of beams operating at any frequency, the multi-beam antenna having a receive signal output port for each of the plurality of beams operating at any frequency, at least one of the plurality of beams collecting an intended signal from at least one remote user, the at least one of the plurality of beams having at least one sidelobe collecting at least one signal from at least one other remote user, the at least one signal from the at least one other remote user acting as interference to the intended signal emerging from the output port of the multi-beam receive antenna associated with the at least one beam collecting an intended signal from at least one remote user, said method performed by means of a separate, dedicated interference cancellation network having as input a plurality of receive signals emerging from the output ports of the receive multi-beam antenna, said interference cancellation network comprising a plurality of dividers and a plurality of combiners, each of said plurality of dividers having a companion combiner and at least one associated combiner, each of said plurality of combiners having a companion divider and at least one associated divider, each of said dividers having an input port for one of the output receive signals corresponding to one of the plurality of beams received by the multi-beam antenna, said method comprising the steps of:

(a) applying each of the receive signals emerging from the output ports of the receive multi-beam antenna to the input ports of each of said dividers, (b) dividing in each of said dividers each of the receive signals into a reference fractional signal and at least one non-reference fractional signal, said reference fractional signal and said non-reference fractional signal therein each having a common source divider, (c) transporting said reference fractional signal to said companion combiner of said common source divider, (d) transporting said at least one non-reference fractional signal to one of said at least one associated combiners of said common source divider, and (e) combining in each of said companion combiners said one reference fractional signal from said companion divider with said at least one non-reference fractional signal from said at least one associated divider into a composite signal, said composite signal thereby optimizing the signal to interference ratio of said intended signal collected from said at least one remote user.

36. The method of claim 35, following step (b) of dividing in each of said dividers each of said receive signals into a reference fractional signal and at least one non-reference fractional signal, further comprising the step of attenuating the amplitude of said at least one of said plurality of non-reference fractional signals to achieve the desired amplitude relative to at least one of said reference fractional signals.

37. The method of claim 35, following step (b) of dividing in each of said dividers each of said receive signals into a reference fractional signal and at least one non-reference fractional signal, further comprising the step of shifting the phase of said at least one of said plurality of non-reference fractional signals to achieve the desired phase relative to the phase of at least one of said reference fractional signals.

38. The method of claim 35 wherein the multi-beam antenna is an active phased array antenna.

39. The method of claim 35 wherein the multi-beam antenna is a reflector class antenna with multiple feeds.

40. The method of claim 35 wherein said method is a method for increasing the beam traffic capacity in a region around any remote user, the size of the region being on the order of 3 to 5 beam widths in any direction from the remote user.

* * * * *